(12) United States Patent
Weaver et al.

(10) Patent No.: US 9,058,078 B2
(45) Date of Patent: Jun. 16, 2015

(54) HIGH-ACCURACY TOUCH POSITIONING FOR TOUCH PANELS

(75) Inventors: Glen Weaver, San Jose, CA (US); Sumant Ranganathan, Saratoga, CA (US); Federico Santiago Cattivelli, Newport Beach, CA (US); Tianhao Li, Tustin, CA (US); Bhupesh Kharwa, San Ramon, CA (US); Satish Vithal Joshi, Cupertino, CA (US); Kerrynn Jacques de Roche, San Jose, CA (US); Pi Sheng Chang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 524 days.

(21) Appl. No.: 13/417,636

(22) Filed: Mar. 12, 2012

(65) Prior Publication Data

US 2013/0176275 A1    Jul. 11, 2013

Related U.S. Application Data

(60) Provisional application No. 61/584,622, filed on Jan. 9, 2012.

(51) Int. Cl.
  *G06F 3/041* (2006.01)
  *G06F 3/044* (2006.01)
(52) U.S. Cl.
  CPC .............. *G06F 3/0416* (2013.01); *G06F 3/044* (2013.01)

(58) Field of Classification Search
  None
  See application file for complete search history.

(56) References Cited

U.S. PATENT DOCUMENTS

| | | | |
|---|---|---|---|
| 6,603,085 B2 | 8/2003 | Oya et al. | |
| 8,564,546 B1 * | 10/2013 | Birch | 345/173 |
| 8,692,795 B1 * | 4/2014 | Kremin et al. | 345/174 |
| 2009/0207145 A1 * | 8/2009 | Tsuzaki et al. | 345/173 |
| 2010/0295810 A1 * | 11/2010 | Nagata et al. | 345/173 |
| 2010/0321314 A1 * | 12/2010 | Oda et al. | 345/173 |
| 2013/0033451 A1 * | 2/2013 | Olson | 345/174 |

* cited by examiner

*Primary Examiner* — Joseph Haley
*Assistant Examiner* — Emily Frank
(74) *Attorney, Agent, or Firm* — Brinks Gilson & Lione

(57) ABSTRACT

Control circuitry for a touch panel includes a touch panel interface, a memory comprising touch positioning logic, and a controller in communication with the memory and the touch panel interface. The controller is operable, when the touch positioning logic is executed, to perform selected processing of the touch panel, including scanning a touch panel and determining a touch panel blob resulting from a touch, obtaining blob characteristics of the touch panel blob, and determining a position of the blob relative to the touch panel based on the blob characteristics. The blob characteristics can be adjusted to more accurately position the blob in circumstances where the blob is located near the edge of the touch panel, is in close proximity to another blob, or when the touch panel has variation in the received signal noise.

20 Claims, 17 Drawing Sheets

500

| 2 | 2 | 2 | 2 | 4 | 4 | 4 | 4 |
|---|---|---|---|---|---|---|---|
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |

Row Index: 0 1 2 3 4 5 6 7

Column Index: 0 1 2 3 4

HIGH-ACCURACY TOUCH POSITIONING FOR TOUCH PANELS

CROSS REFERENCE TO RELATED APPLICATION

The present application claims the benefit of the filing date under 35 U.S.C. §119(e) of Provisional U.S. Patent Application Ser. No. 61/584,622, which was filed on Jan. 9, 2012, and is hereby incorporated herein by reference in its entirety.

TECHNICAL FIELD

This disclosure relates to methods and apparatus for capacitive touch screen devices.

BACKGROUND

Continual development and rapid improvement in portable devices has included the incorporation of touch screens in these devices. A touch screen device responds to a user's touch to convey information about that touch to a control circuit of the portable device. The touch screen is conventionally combined with a generally coextensive display device such as a liquid crystal display (LCD) to form a user interface for the portable device. The touch screen also operates with a touch controller circuit to form a touch screen device. In other applications using touch sensing, touch pads may also be part of the user interface for a device such as a personal computer, taking the place of a separate mouse for user interaction with the onscreen image. Relative to portable devices that include a keypad, rollerball, joystick or mouse, the touch screen device provides advantages of reduced moving parts, durability, resistance to contaminants, simplified user interaction and increased user interface flexibility.

Despite these advantages, conventional touch screen devices have been limited in their usage to date. For some devices, current drain has been too great. Current drain directly affects power dissipation which is a key operating parameter in a portable device. For other devices, performance such as response time has been poor, especially when subjected to fast motion at the surface of the touch screen. Some devices do not operate well in environments with extreme conditions for electromagnetic interference and contaminants that can affect performance.

Further limitations and disadvantages of conventional and traditional approaches will become apparent to one of ordinary skill in the art through comparison of such approaches with aspects of the present disclosure as set forth in the remainder of this application and with reference to the accompanying drawings.

BRIEF DESCRIPTION OF THE DRAWINGS

The system may be better understood with reference to the following drawings and description. In the figures, like reference numerals designate corresponding parts throughout the different views.

FIG. 5 shows an exemplary first sample asymmetric scan map.

DETAILED DESCRIPTION

Figure 1:
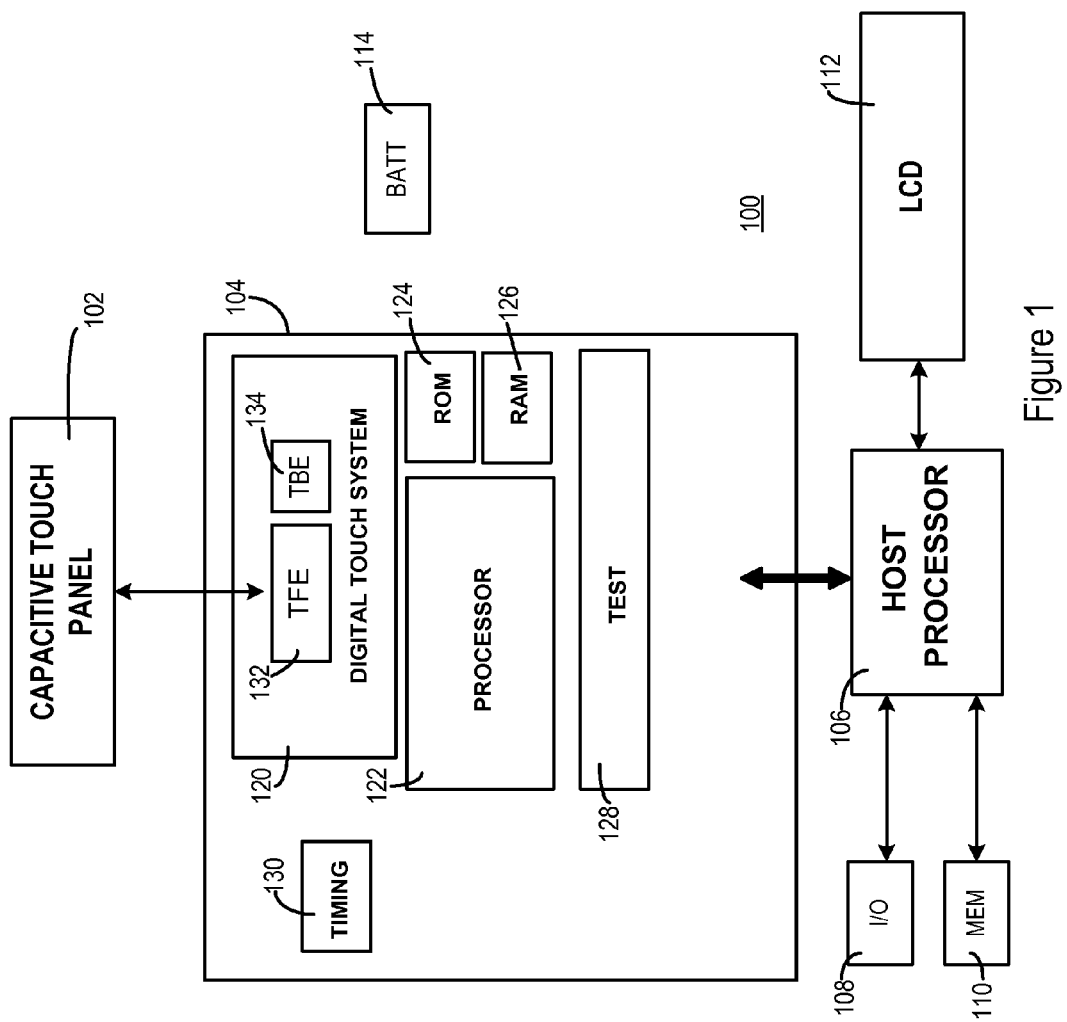
FIG. 1 is a block diagram of an exemplary portable device.

Referring now to FIGS. 1 and 2, FIG. 1 shows a block diagram of a portable device 100. FIG. 2 is one embodiment of a portable device 100 according to the block diagram of FIG. 1. As shown in FIG. 1, the portable device 100 includes a capacitive touch panel 102, a controller circuit 104, a host processor 106, input-output circuit 108, memory 110, a liquid crystal display (LCD) 112 and a battery 114 to provide operating power.

Figure 2B:
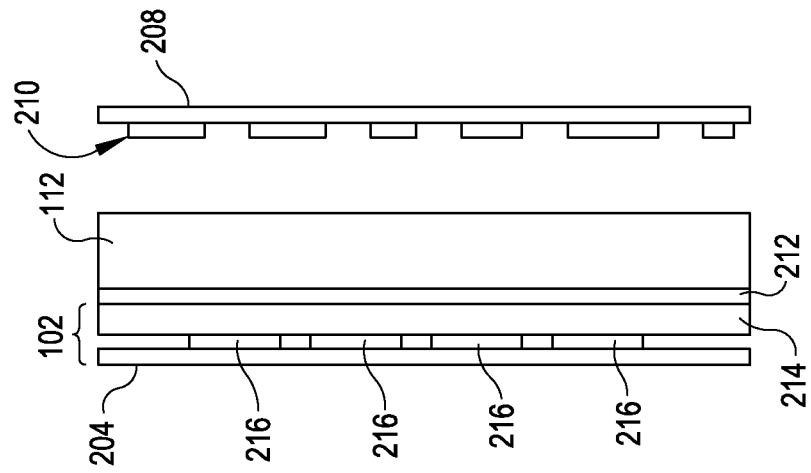
FIG. 2 is a top view of an exemplary portable device.
Figure 2A:
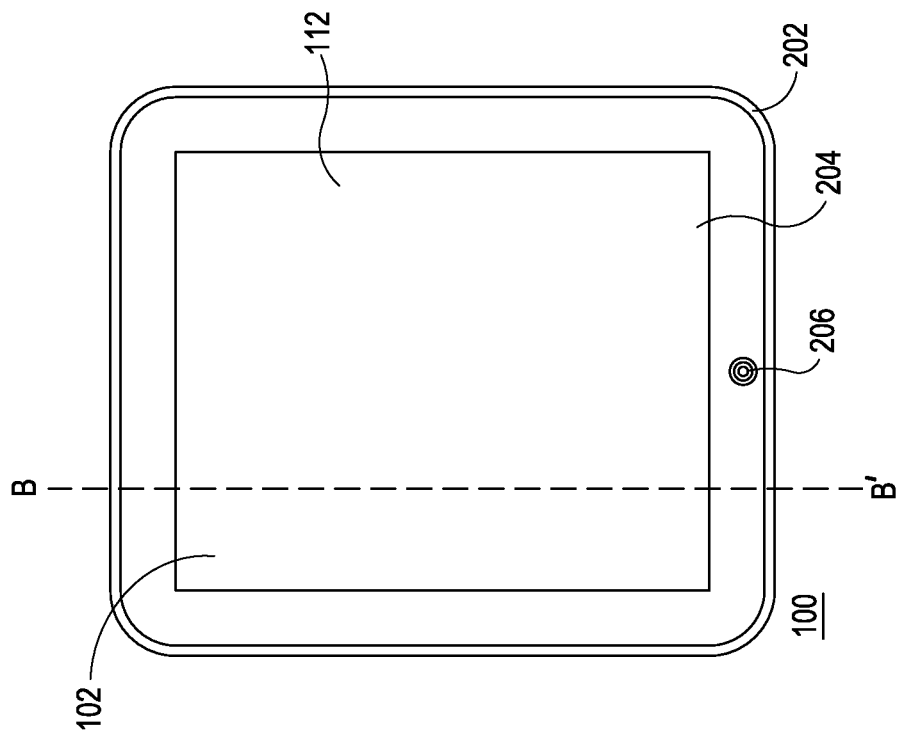

FIG. 2 includes FIG. 2A which shows a top view of the portable device 100 and FIG. 2B which shows a cross-sectional view of the portable device 200 along the line B-B' in FIG. 2A. The portable device may be embodied as the widest variety of devices including as a tablet computer, a smart phone, or even as a fixed device with a touch-sensitive surface or display.

The portable device 100 includes a housing 202, lens or a clear touch surface 204 and one or more actuatable user interface elements such as a control switch 206.

Contained within the housing are a printed circuit board 208 circuit elements 210 arranged on the printed circuit board 208 and as are shown in block diagram form in FIG. 1. The capacitive touch panel 102 is arranged in a stack and includes a drive line 212, an insulator 214 and a sense line 216. The insulator electrically isolates the drive line 212 and other drive lines arranged parallel to the drive line from the sense lines 216. Signals are provided to one or more of the drive lines 212 and sensed by the sense lines 216 to locate a touch event on the clear touch surface 204. The LCD 112 is located between the printed circuit board 208 and the capacitive touch panel 102.

As is particularly shown in FIG. 2A, the capacitive touch panel 102 and the LCD 112 may be generally coextensive and form a user interface for the portable device. Text and images may be displayed on the LCD for viewing and interaction by a user. The user may touch the capacitive touch panel 102 to control operation of the portable device 100. The touch may be by a single finger of the user or by several fingers, or by other portions of the user's hand or other body parts. The touch may also be by a stylus gripped by the user or otherwise brought into contact with the capacitive touch panel. Touches may be intentional or inadvertent. In another application, the capacitive touch panel 102 may be embodied as a touch pad of a computing device. In such an application, the LCD 112 need not be coextensive (or co-located) with the capacitive touch panel 102 but may be located nearby for viewing by a user who touches the capacitive touch panel 102 to control the computing device.

Referring again to FIG. 1, the controller circuit 104 includes a digital touch system 120, a processor 122, memory including persistent memory 124 and read-write memory 126, a test circuit 128 and a timing circuit 130. In one embodiment, the controller circuit 104 is implemented as a single integrated circuit including digital logic and memory and analog functions.

The digital touch subsystem 120 includes a touch front end (TFE) 132 and a touch back end (TBE) 134. This partition is not fixed or rigid, but may vary according to the high-level function(s) that each block performs and that are assigned or considered front end or back end functions. The TFE 132 operates to detect the capacitance of the capacitive sensor that comprises the capacitive touch-panel 102 and to deliver a high signal to noise ratio (SNR) capacitive image (or heatmap) to the TBE 134. The TBE 134 takes this capacitive heatmap from the TFE 132 and discriminates, classifies, locates, and tracks the object(s) touching the capacitive touch panel 102 and reports this information back to the host processor 106. The TFE 132 and the TBE 134 may be partitioned among hardware and software or firmware components as desired, e.g., according to any particular design requirements. In one embodiment, the TFE 132 will be largely implemented in hardware components and some or all of the functionality of the TBE 134 may be implemented by the processor 122.

The processor 122 operates in response to data and instructions stored in memory to control the operation of the controller circuit 104. In one embodiment, the processor 122 is a reduced instruction set computer (RISC) architecture, for example as implemented in an ARM processor available from ARM Holdings. The processor 122 receives data from and provides data to other components of the controller circuit 104. The processor 122 operates in response to data and instructions stored in the persistent memory 124 and read-write memory 126 and in operation writes data to the memories 124, 126. In particular, the persistent memory 124 may store firmware data and instructions which are used by any of the functional blocks of the controller circuit 104. These data and instructions may be programmed at the time of manufacture of the controller 104 for subsequent use, or may be updated or programmed after manufacture.

The timing circuit 130 produces clock signals and analog, time-varying signals for use by other components of the controller circuit 104. The clock signals include digital clock signal for synchronizing digital components such as the processor 122. The time-varying signals include signals of predetermined frequency and amplitude for driving the capacitive touch panel 102. In this regard, the timing circuit 130 may operate under control or responsive to other functional blocks such as the processor 122 or the persistent memory 124.

Figure 3:
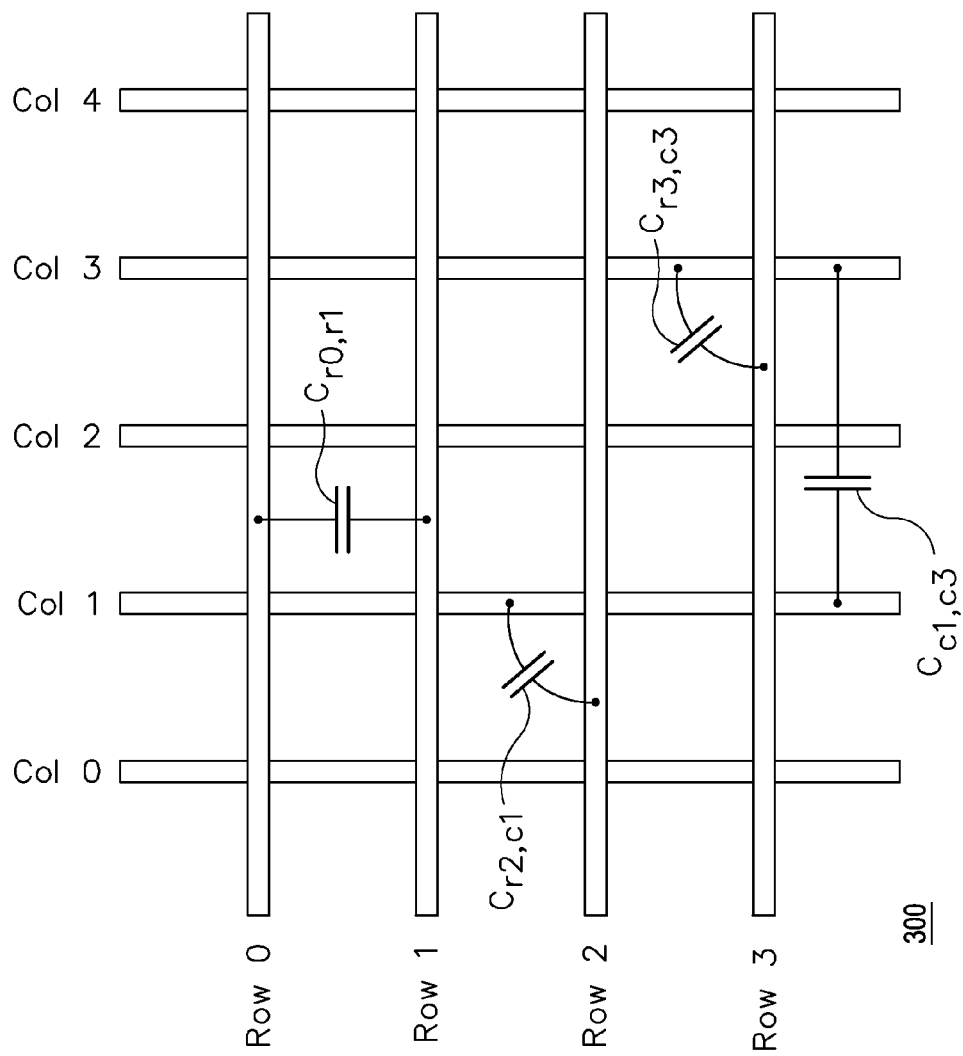
FIG. 3 is a simplified diagram of an exemplary mutual capacitance touch panel for use in the portable device of FIGS. 1 and 2.

FIG. 3 shows a diagram of a typical mutual capacitance touch panel 300. The capacitive touch panel 300 models the capacitive touch panel 102 of the portable device of FIGS. 1 and 2. The capacitive touch panel 300 has $N_{row}$ rows and $N_{col}$ columns ($N_{row}$=4, $N_{col}$=5 in FIG. 3). In this manner, the capacitive touch panel 300 creates $N_{row} \times N_{col}$ mutual capacitors between the $N_{row}$ rows and the $N_{col}$ columns. These are the mutual capacitances that the controller circuit 104 commonly uses to sense touch, as they create a natural grid of capacitive nodes that the controller circuit 104 uses to create the typical capacitive heatmap. However, it is worth noting that there are a total of ($N_{row}+N_{col}$)—or ($N_{row}+N_{col}+2$) nodes if a touching finger or stylus and ground node in the capacitive touch panel 300 are included. A capacitance exists between every pair of nodes in the capacitive touch panel 300.

Stimulus Modes

The capacitive touch panel 300 can be stimulated in several different manners. The way in which the capacitive touch panel 300 is stimulated impacts which of the mutual capacitances within the panel are measured. A list of the modes of operation is detailed below. Note that the modes defined below only describe the manner in which the TFE 132 stimulates the panel.

Row-column (RC) mode is a first operating mode of a mutual capacitive sensor. In RC mode, the rows are driven with transmit (TX) waveforms and the columns are connected to receive (RX) channels of the TFE 132. Therefore, the mutual capacitors between the rows and the columns are detected, yielding the standard $N_{row} \times N_{col}$ capacitive heatmap. In the example shown in FIG. 3, RC mode measures the capacitors label $C_{r<i>,c<j>}$, where <i> and <j> are integer indices of the row and column, respectively. Generally, there is no incremental value in supporting column-row (CR) mode, (e.g., driving the columns and sensing the rows), as it yields the same results as RC mode.

Self-capacitance column (SC) mode is a self-capacitance mode that may be supported by the controller 102. In SC mode, one or more columns are simultaneously driven and sensed. As a result, the total capacitance of all structures connected to the driven column can be detected.

In column-listening (CL) mode, the RX channels are connected to the columns of the capacitive touch panel 102 and the transmitter is turned off. The rows of the capacitive touch panel 102 will either be shorted to a low-impedance node (e.g., AC ground), or left floating (e.g., high-impedance). This mode is used to listen to the noise and interference present on the panel columns. The output of the RX channels will be fed to a spectrum estimation block in order to determine the appropriate transmit signal frequencies to use and the optimal interference filter configuration, as will be described in further detail below.

Timing Terminology

Some terminology is introduced for understanding the various timescales by which results are produced within the TFE 132. The TFE 132 produces a capacitive heatmap by scanning all desired nodes of the capacitive touch panel 102 (e.g., all of the nodes, or some specified or relevant subset of all of the nodes). This process may be referred to as a frame scan; the frame scan may run at a rate referred to as the frame rate. The frame rate may be scalable. One exemplary frame rate includes a frame rate of 250 Hz for single touch and a panel size less than or equal to 5.0 inches in size. A second exemplary frame rate is 200 Hz for single touch and a panel size greater than 5.0 inches. A third exemplary frame rate is 120 Hz minimum for 10 touches and a panel size of 10.1 inches. Preferably, the controller 104 can support all of these frame rates and the frame rate is configurable to optimize tradeoff of performance and power consumption for a given application. The term scan rate may be used interchangeably with the term frame rate.

The controller circuit 104 may assemble a complete frame scan by taking a number of step scans. Qualitatively, each step scan may result in a set of capacitive readings from the receivers, though this may not be strictly done in all instances. The controller circuit 104 may perform each step scan at the same or different step rate. For a row/column (RC) scan, where the transmitters are connected to the rows and the receivers are connected to the columns, it will take $N_{row}$ step scans to create a full frame scan. Assuming a tablet-sized capacitive touch panel 102 with size 40 rows×30 columns, the step rate may be at least 8 kHz to achieve a 200 Hz frame rate.

For all mutual-capacitance scan modes a touch event causes a reduction in the mutual capacitance measured. The capacitive heatmap that is created by the TFE 132 will be directly proportional to the measured capacitance. Therefore, a touch event in these scan modes will cause a reduction in the capacitive heatmap. For all self-capacitance scan modes, a touch event causes an increase in the capacitance measured. The capacitive heatmap that is created by the TFE 132 will be directly proportional to the measured capacitance. Therefore, a touch event in these scan modes will cause a local increase in the capacitive heatmap.

Figure 4:
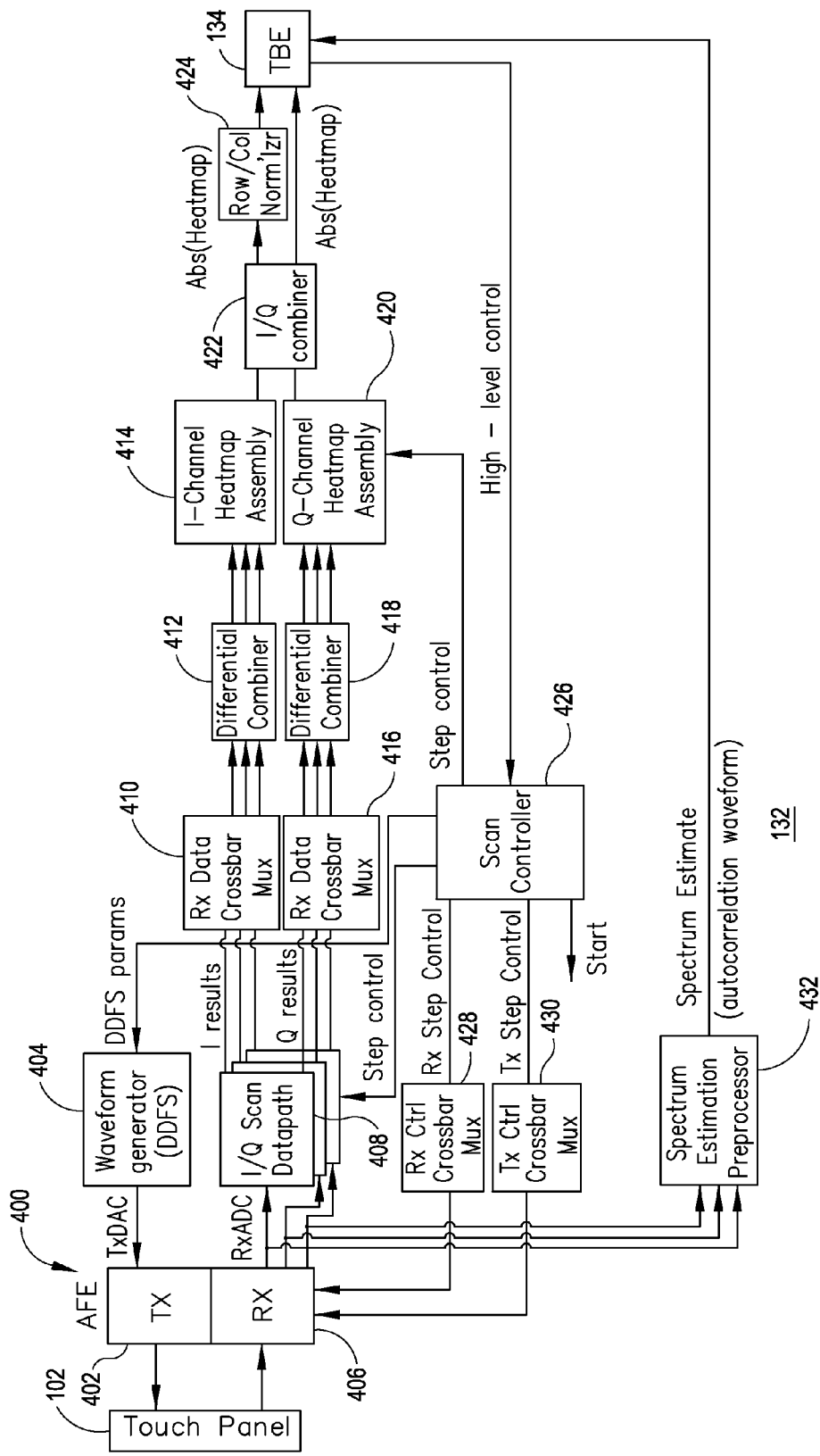
FIG. 4 shows an exemplary block diagram of the touch front end of the portable device of FIG. 1.

Referring now to FIG. 4, it shows a block diagram of the touch front end (TFE) 132 of FIG. 1. In the illustrated embodiment, the TFE 132 includes 48 physical transmit channels and 32 physical receive channels. Additionally, some embodiments of the TFE 132 may contain circuitry such as power regulation circuits, bias generation circuits, and clock generation circuitry. To avoid unduly crowding the drawing figure, such miscellaneous circuitry is not shown in FIG. 4.

The TFE 132 includes transmit channels 402, a waveform generation block 404, receive channels 406 and I/Q scan data paths 408. The transmit channels 402 and the receive channels 406 collectively may be referred to as the analog front end (AFE) 400. The TFE 132 further includes, for the in-phase results from the I/Q scan data path, a receive data crossbar multiplexer 410, a differential combiner 412 and an in-phase channel assembly block 414. Similarly for the quadrature results, the TFE 132 includes a receive data crossbar multiplexer 416, a differential combine 418 and an in-phase channel assembly block 420. The in-phase results and the quadrature results are combined in an I/Q combiner 422. The absolute value of the data is provided to a row and column normalizer 424 and then made available to the touch back end (TBE) 134. Similarly, the heatmap phase information from the I/Q combiner 422 is provided to the TBE 134 as well.

The TFE 132 further includes a scan controller 426, read control crossbar multiplexer 428 and transmit control crossbar multiplexer 430. Further, the TFE 132 includes a spectrum estimation processor 436 as will be described below in further detail. The spectrum estimation processor 436 provides a spectrum estimate to the TBE 134. The scan controller 426 receives high level control signals from the TBE 134 to control which columns are provided with transmit signals and which rows are sensed.

The receive data crossbar multiplexers 410, 416 and the receive control crossbar multiplexer 428 together for a receive crossbar multiplexer. These two multiplexers are used to logically remap the physical receive TFE channels by remapping both their control inputs and data outputs. As such, the control signals routed to both multiplexers may be identical, as the remapping performed by the receive data multiplexers 410, 416 and the receive control multiplexer 428 needs to be identical.

The receive data crossbar multiplexers 410, 416 sit between the output of the I/Q scan data path 408 and the heatmap assembly blocks 414, 420. The purpose of the receive data crossbar multiplexers 410, 416 is to enable the logical remapping of the receive channels. This in turn allows for logical remapping of the electrical connectors such as pins or balls which connect the integrated circuit including the controller 104 to other circuit components of the portable device 100. This will in turn enable greater flexibility in routing a printed circuit board from the integrated circuit including the controller 104 to the capacitive touch panel 102.

Since the I/Q scan data path 408 outputs complex results, the receive crossbar multiplexer may be able to route both the I and Q channels of the scan data path output. This can easily be achieved by instantiating two separate and identical crossbar multiplexers 410, 416. These two multiplexers will share the same control inputs.

The receive control crossbar multiplexer 428 sits between the scan controller 426 and the AFE 400. It is used to remap the per-channel receive control inputs going into the AFE 400. The structure of the receive control crossbar multiplexer 428 may be the same as for the receive data crossbar multiplexer 410, 416.

Since the Rx Ctrl crossbar is used in conjunction with the Rx Data crossbar to logically remap the RX channels, it may be programmed in conjunction with the Rx data crossbar. The programming of the receive control multiplexer 428 and the receive data crossbar multiplexers 410, 416 are not identical. Instead the programming may be configured so that the same AFE to controller channel mapping achieved in one multiplexer is implemented in the other.

The scan controller 426 forms the central controller that facilitates scanning of the capacitive touch panel 102 and processing of the output data in order to create the capacitive heatmap. The scan controller 426 operates in response to control signals from the TBE 134.

Scan Controller Modes of Operation

The scan controller 426 may support many different modes. A brief description of each mode is listed below. Switching between modes is typically performed at the request of the processor 122 (FIG. 1), with a few exceptions noted below.

Active scan mode is considered the standard mode of operation, where the controller 104 is actively scanning the capacitive touch panel 102 in order to measure the capacitive heatmap. Regardless of what form of panel scan is utilized, the scan controller 426 steps through a sequence of step scans in order to complete a single frame scan.

In single-frame mode, the controller initiates one single frame scan at the request of the processor 122. After the scan is complete, the capacitive heatmap data is made available to the processor 122 and the scan controller 426 suspends further operation until additional instructions are received from the processor 426. This mode is especially useful in chip debugging.

In single-step mode, the controller initiates one single step scan at the request of the processor 122. After the scan is complete, the outputs of the scan data path 408 are made available to the processor 122 and the scan controller 426 suspends further operation until additional instructions are received from the processor 122. This mode is especially useful in chip testing and debugging.

Idle scan mode is a mode initiated by the processor 122 in order to run the controller 104 in a lower-performance mode. Typically, this mode will be selected when the controller 122 does not detect an active touch on the screen of the capacitive touch panel 102, but still wants reasonably fast response to a new touch. Therefore, the controller 122 is still active and capable of processing the heatmap data produced by the TFE 132.

The primary differences between active scan mode and idle scan mode are twofold. First, the frame rate in idle scan mode will typically be slower than that used in active scan mode. Duty cycling of the AFE 400 and other power reduction modes will be used in order to reduce total power consumption of the controller 104 during idle scan. Second, the length of time used to generate a single frame scan may be shorter in idle scan mode than in active scan mode. This may be achieved by either shortening the duration of a step scan or by performing fewer step scans per frame. Reducing total frame scan time can further reduce power at the expense of reduced capacitive heatmap signal to noise ratio (SNR).

Spectrum estimation mode is used to measure the interference and noise spectrum coupling into the receive channels. This measurement is then analyzed by the processor 122 to determine the appropriate transmit frequency and calculate the optimal filter coefficients for the filters within the scan data path 408. This mode is typically used with the Column Listening mode.

In spectrum estimation mode, most of the blocks of the TFE 132 in FIG. 4 are disabled. The scan controller 426, the AFE 400, and the spectrum estimation preprocessor 432 may be used. The transmit channel 402 of the AFE 400 is powered down, and the receive channel 406 of the AFE 400 records the background noise and interference signals that couple into the capacitive touch panel 102. The receive data from all of the channels of the AFE 400 are routed to the spectrum estimation preprocessor 432, which performs mathematical preprocessing on this data. The output of the spectrum estimation preprocessor 432 will be an N-point vector of 16-bit results, where N is approximately 200. The output of the spectrum estimation preprocessor 432 is handed off to the processor 122 for further analysis and determination of the appropriate transmit frequency to use. This process is described in greater detail below.

In addition to the functional modes described above, the controller 104 may have a set of sleep modes, where various functional blocks in the controller 104 are disabled and/or powered down completely.

A frame scan includes of a series of step scans. The structure of each step scan may be identical from step scan to the next within a given frame scan; however, the exact values of control data vary from step scan to step scan. Furthermore, the operation of a given frame scan may be determined by configuration parameters and may or may not affected by data values measured by the receive channel. One example of the frame scan logic that the controller circuit 104 may implement is shown below.

//Initialization
Set DDFS parameters;
Clear heatmap_memory;
//Step scan loop
For step_idx=1 to num_step_scans{
  //Configure circuits according to step_idx
  Set scan_datapath_control to scan_datapath_parameters [step_idx];
  Assert Rx_reset and wait TBD clock cycles;
  Set AFE_control_inputs to AFE_parameters[step_idx];
  Deassert Rx_reset and wait TBD clock cycles;
  //Run step scan and collect data
  Send start signal to DDFS and scan data path;
  Wait for TBD clock cycles for step scan to complete;
  Pass datapath_results[step_idx] to heatmap assembly block
  //Incremental heatmap processing
}//step_idx loop The incremental heatmap processing operation is described in greater detail below.

Multi-transmit Support and Block Stimulation of the Panel

In order to achieve improved SNR in the capacitive heatmap, the controller circuit 104 provides support for multi-transmit (multi-Tx) stimulation of the capacitive control panel 102. Multi-Tx simulation (or Multi-Tx) means that multiple rows of the panel are simultaneously stimulated with the transmit (Tx) signal, or a polarity-inverted version of the Tx signal, during each step scan. The number and polarity of the rows stimulated, may be controlled through control registers in the AFE 400. The number of rows simultaneously stimulated during multi-Tx is defined as a parameter $N_{multi}$. $N_{multi}$ may be a constant value from step-to-step within a given frame and also from frame-to-frame.

If $N_{multi}$ rows are simultaneously stimulated during a step scan, it will take at least $N_{multi}$ step scans to resolve all the pixel capacitances being stimulated. Each receiver has $N_{multi}$ capacitances being stimulated during a scan step. Hence there are $N_{multi}$ unknown capacitances, requiring at least $N_{multi}$ measurements to resolve these values. During each of these $N_{multi}$ steps, the polarity control of the Tx rows will be modulated by a set of Hadamard sequences. Once this set of $N_{multi}$ (or more) step scans is complete, the next set of $N_{multi}$ rows can be stimulated in the same fashion, as $N_{multi}$ will almost always be less than the number of actual rows in the capacitive touch panel 102.

In this way, the processing of the entire capacitive touch panel 102 occurs in blocks, where $N_{multi}$ rows of pixels are resolved during one batch of step scans, and then the next $N_{multi}$ rows of pixels are resolved in the next batch of step scans, until all the panel rows are fully resolved.

In most scenarios, the number of panel rows will not be an exact multiple of $N_{multi}$. In these situations, the number of rows scanned during the final block of rows will be less than $N_{multi}$. However, $N_{multi}$ scan steps may be performed on these remaining rows, using specified non-square Hadamard matrices.

Differential Scan Mode

Differential scan mode is an enhancement to normal scanning mode, whereby the frame scan operation is modified to exploit the correlation of the interference signal received across adjacent receive channels. In this mode, the normal frame scan methodology is performed; however the number of step scans used to assemble a single frame is doubled. Conceptually, each step scan in the scan sequence becomes two step scans: the first is a single-ended or normal step scan with the default values for the AFE control registers, and the second is a differential step scan.

Given $N_{Rx}$ receive channels, the differential scan mode yields a total of $2N_{RX}$ receiver measurements per aggregate scan step. (e.g., $N_{RX}$ single-ended measurements and $N_{RX}$ differential measurements.) These $2N_{RX}$ measurements are recombined and collapsed into $N_{RX}$ normal measurements in the Differential Combiner block 412, 418 shown in FIG. 4.

Figure 6:
FIG. 6 shows an exemplary second sample asymmetric scan map.

FIGS. 5 and 6 show examples of asymmetric scan maps 500 and 600.

Figure 7:
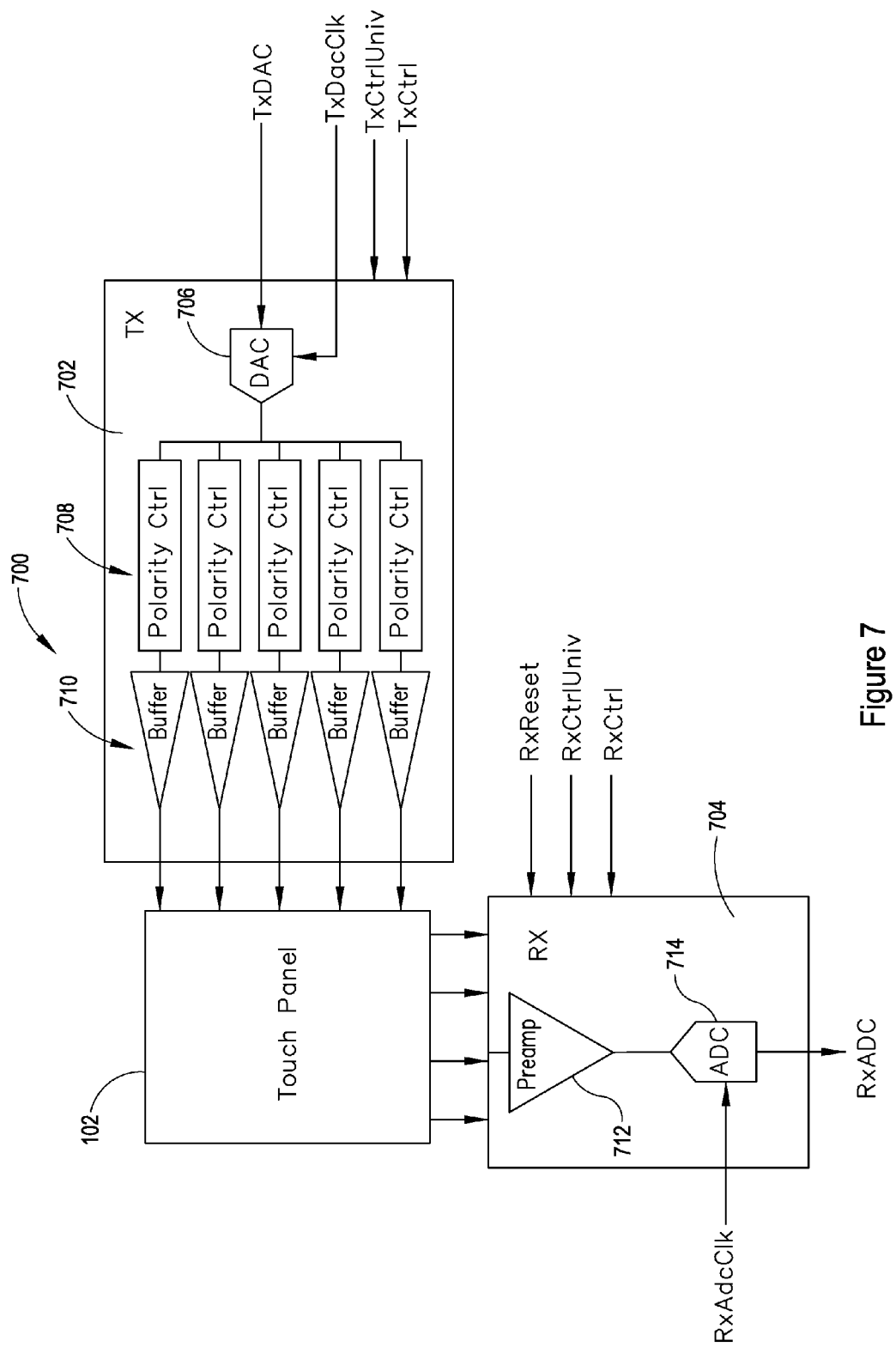
FIG. 7 shows an exemplary high-level architecture of the touch front end of the portable device of FIG. 1.

FIG. 7 shows a high-level architecture 700 of the analog front end. The architecture 700 includes a transmit channel 702 providing signals to columns of the capacitive touch panel 102 and a receive channel 704 sensing signals from the capacitive touch panel 102. The transmit channel 702 includes a digital to analog converter 706, polarity control circuits 708 and buffers 710. The receive channel 704 includes a pre-amplifier 712 and analog to digital converter 714.

All transmit channels may be driven by a shared transmit data signal labeled TxDaC in FIG. 7. Each physical transmit channel may also receive a common transmit digital to analog converter clock signal, labeled TxDacClk, to drive the transmit digital to analog converter 706. The clock signal will come directly from a frequency locked loop block within the TFE 132, and this clock signal will also be routed to the digital portion of the TFE 132.

Each physical transmit channel may also have its own set of channel-specific TxCtrl bits that appropriately control various parameters of the transmit channel, such as enable/disable, polarity control, and gain/phase control. These TxCtrl bits are not updated at the TxDacClk rate, but rather are updated between subsequent step scans during the frame scan operation.

A control signal controls the transmit polarity of each of the 48 transmit channels. As will be described in greater detail below, the polarity of the transmit outputs may be modulated in an orthogonal sequence, with each transmit output having a fixed polarity during each scan step during a frame scan.

All receive channels will receive a set of common clock signals. These clock signals are provided directly from a frequency locked loop block within the TFE 132, and this clock signal is also routed to the digital portion of the TFE 132. The clock signals routed to the RX channels include the signal RxADCClk which drives the RxADC. A typical clock frequency for this signal is 48 MHz.

Each physical receive channel will also have its own set of channel-specific receive control bits, labeled RxCtrl in FIG. 7, that appropriately control various parameters of the receive channel, such as enable/disable and gain control. These receive control bits are updated between subsequent step scans during the frame scan operation.

Additionally, there may be a shared set of control settings, labeled RxCtrlUniv in FIG. 7, that will control all receive channels simultaneously. These registers are primarily composed of generic control bits that will remain constant for a given implementation of the controller 104.

There are also one or more reset lines labeled RxReset that are common to all reset channels. These reset lines may be asserted in a repeatable fashion prior to each scan step.

Waveform Generation

The waveform generation block (WGB) 404 in FIG. 4 generates the transmit waveform for the TX channels 402. The WGB 404 generates a digital sine wave. Additionally, WGB 404 may generate other simple periodic waveforms; such as square waves having edges with programmable rise and fall times.

The primary output of the WGB 404 is the data input to the transmit channels 402 labelled TxDAC in FIG. 4. The WGB 404 receives as input signals a clock signal labelled TxDacClk and a signal labelled Start in FIG. 4. Upon receiving the Start signal from the scan controller 426, the WGB 404 begins producing digital waveforms for the duration of a single step scan. At the conclusion of the step scan, the WGB 404 ceases operation and waits for the next start signal from the scan controller 426.

The WGB 404 may have some amount of amplitude control, but the WGB 404 will typically be operated at maximum output amplitude. Therefore, the performance requirements listed below only need to be met at max output amplitude. All signal outputs may be in two's complement format. The WGB 404 may also provide arbitrary sine/cosine calculation capabilities for the scan data path 408 and spectrum estimation preprocessor 432.

The following table lists typical performance for the WGB 404.

| Specification | Min | Nom | Max | Comment |
| --- | --- | --- | --- | --- |
| Clock rate | | 8 MHz | | Will operate at TxDacClk rate |
| Output frequency | 0 Hz | — | 2 MHz | |
| Frequency ctrl | — | 15 bits | — | Desired resolution |

-continued

| Specification | Min | Nom | Max | Comment |
| --- | --- | --- | --- | --- |
| resolution | | | | of ~61 Hz. Can be different. |
| # of output bits | — | 8 | — | |
| Output amplitude | 50% amplitude | 100% amplitude | 100% amplitude | |
| Amplitude ctrl resolution | — | 7 bits | — | Corresponds to 1% stepsize in amplitude control. |
| DC bias control | 0 | 0 | 0 | All outouts should be balanced around 0 |
| Output THD | | | −40 dBFs | Sine wave mode only |
| Rise/fall time | 1 clock cycle @ 8 MHz | — | 256 clock cycles @ 8 MHz | Square-wave mode only. Independent control of rise time vs. fall time NOT required. |

In FIG. 4, the differential combiner blocks 412, 410 provide the capability to operate in differential mode, where the receive channels 406 alternate step scans between single-ended measurements and differential measurements. The purpose of the differential combiner blocks 412, 418 is to combine the $N_{Rx}$ single-ended measurements and ($N_{RX}-1$) differential measurements into a single set of $N_{RX}$ final results for use in the heatmap assembly blocks 414, 420 that follow.

The differential combiner blocks 412, 418 are akin to a spatial filter. Let the vector, c, be an $N_{rx}$-by-1 vector of the capacitances to estimate. In differential mode, you have a vector, s, of single-ended measurements and a vector, d, of differential measurements. Hence, an estimate of c, called $c_{est}$, is sought by optimally recombining s and d. Determining the optimal recombination requires substantial computation, but simulations have shown that the following recombination scheme works to within roughly 0.5 dB of optimal performance over the expected range of operating conditions:

$$c_{est,n} = a_1 \cdot s_{n-2} + a_2 \cdot s_{n-1} + a_3 \cdot s_n + a_2 \cdot s_{n+1} + a_1 \cdot s_{n+2} + b_1 \cdot d_{n-1} + b_2 \cdot d_n - b_2 \cdot d_{n+1} - b_1 \cdot d_{n+2}$$

where the subscript n indicates result from the $n^{th}$ receiver channel, and $0 \le n \le N_{RX}-1$.

Furthermore, the coefficients are subject to the following constraints:

$0 \le a_1, a_2, a_3 \le 1$ $a_3 = 1 - 2a_1 - 2a_2$ $b_1 = a_1$ $b_2 = a_1 + a_2$

Given these constraints, it can be observed that the math operation listed above can be collapsed into two multiplication operations:

$$c_{est,n} = s_n + a_1 \cdot (s_{n-2} - 2s_n + s_{n+2} + d_{n-1} + d_n - d_{n+1} - d_{n+2}) + a_2 \cdot (s_{n-1} - 2s_n + s_{n+1} + d_n - d_{n+1})$$

The equations above assume that the data exists for 2 receivers on either side of the nth receiver. (e.g., $2 \le n \le N_{RX}-3$) Therefore, the equations above may be modified for the two outer edge receive channels on either side. The modifications are quite simple. First, replace any non-existent $s_k$ term with the nearest neighboring $s_j$ term that does exist. Second, replace any non-existent $d_k$ term with 0. Putting these rules together and expressing the mathematics in matrix form, we get:

$$c_{est} = \begin{bmatrix} a_1+a_2+a_3 & a_2 & a_1 & 0 & 0 & -b_2 & -b_1 & 0 & 0 \\ a_1+a_2 & a_3 & a_2 & a_1 & 0 & b_2 & -b_2 & -b_1 & 0 \\ a_1 & a_2 & a_3 & a_2 & a_1 & b_1 & b_2 & -b_2 & -b_1 \\ \vdots & \vdots & \vdots & \vdots & \vdots & \vdots & \vdots & \vdots & \vdots \\ a_1 & a_2 & a_3 & a_2 & a_1 & b_1 & b_2 & -b_2 & -b_1 \\ 0 & a_1 & a_2 & a_3 & a_2+a_1 & 0 & b_1 & b_2 & -b_2 \\ 0 & 0 & a_1 & a_2 & a_3+a_2+a_1 & 0 & 0 & b_1 & b_2 \end{bmatrix} \cdot \begin{bmatrix} s_0 \\ \vdots \\ s_{N_{RX}-1} \\ d_1 \\ \vdots \\ d_{N_{RX}-1} \end{bmatrix}$$

Lastly, while the optimal values of {a1, a2, a3, b1, b2} are dependent upon the precise noise and interference environment, it has been found that the following values for these parameters operate near optimal performance for the expected range of operating environments:

$a_1 = 1/8$
$a_2 = 7/32$
$a_3 = 5/16$
$b_1 = 1/8 \cdot k_{ADC}$
$b_2 = 11/32 \cdot k_{ADC}$ The parameters $b_1$ and $b_2$ above are dependent upon another parameter, $k_{ADC}$. The new parameter, $k_{ADC}$, is dependent upon the value of receive channel analog to digital converter gain (Rx_AdcGain) used during the differential measurement step, as detailed in the table below:

| Rx_AdcGain<1:0> used during differential measurement step | $k_{ADC}$ |
|---|---|
| 00 | 1 |
| 01 | 3/4 |
| 10 | 1/2 |
| 11 | 3/8 |

These a and b coefficients should be programmable by a control source such as firmware that is part of the controller 104, but the default values should be those listed above. The table below indicates the suggested bit width for each coefficient:

| Coefficient | Bit width |
|---|---|
| $a_1$ | 5 |
| $a_2$ | 5 |
| $a_3$ | 5 |
| $b_1$ | 6 |
| $b_2$ | 8 |

The heatmap assembly blocks (HAB) 414, 420 take the step scan outputs from the scan data path 408 or differential combiners 412, 418, if used, and assemble the complete capacitive heatmap that is the major output of the frame scan operation. In order to do so, they may mathematically combine all of the step scan outputs in the appropriate manner to create estimates of the capacitance values of the individual capacitive pixels in the capacitive touch panel 102.

As shown in FIG. 4, there are two separate and identical instantiations of the HAB. A first HAB 414 is for the I-channel data and a second HAB 420 is for the Q-channel data. Each HAB 414, 418 operates on the either the I-channel or Q-channel data in order to create either an I-channel or a Q-channel capacitive heatmap.

Figure 8:
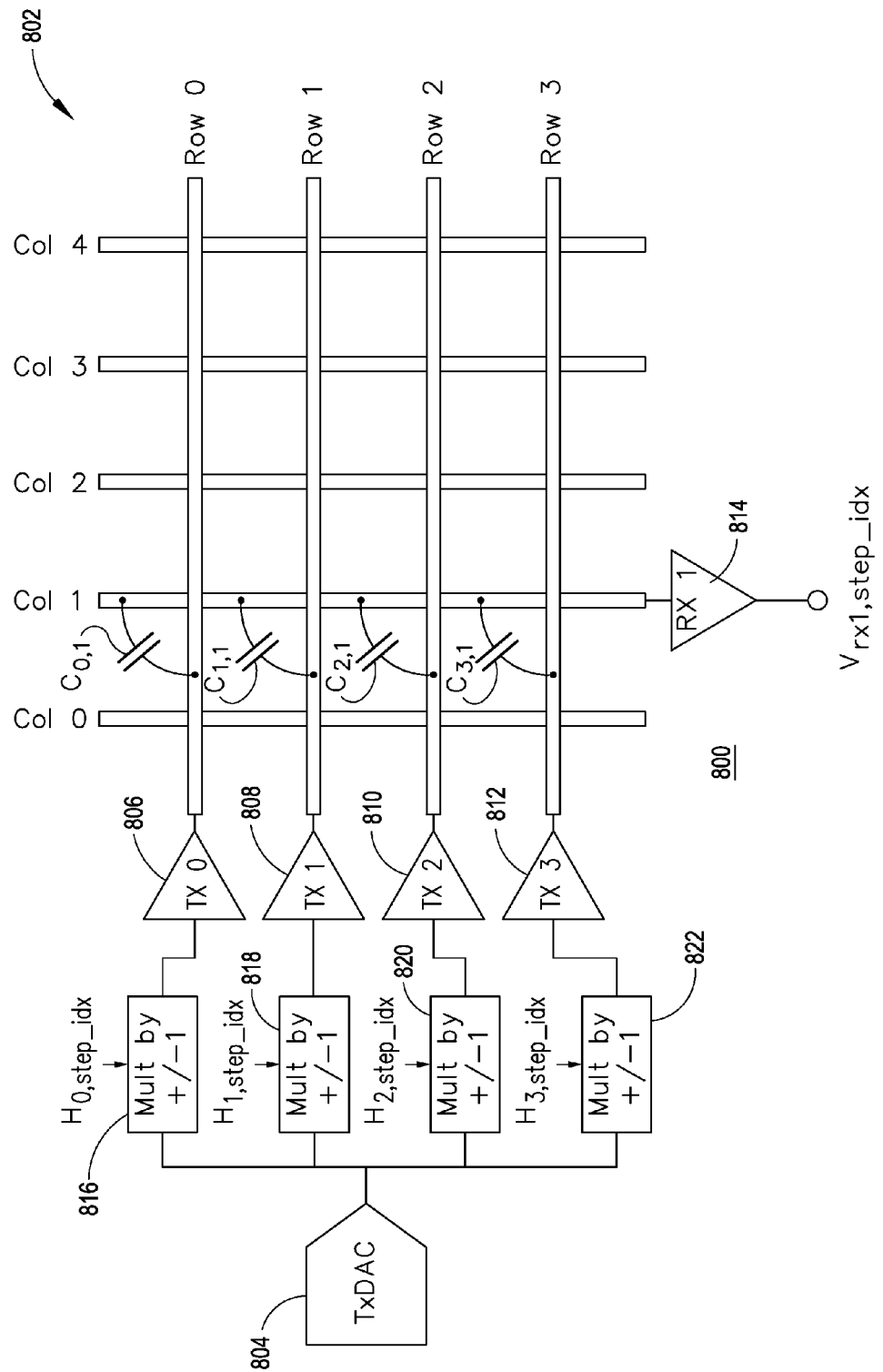
FIG. 8 shows a simplified capacitive touch panel and related circuitry.

In order to demonstrate the mathematics that may apply for heatmap assembly, an example 4×5 capacitive touch panel 800 is illustrated in FIG. 8. In this example, only the capacitive pixels in column 1 are analyzed, but the same principle can be easily extended to each of the five columns in the example capacitive touch panel 800. In particular, the output of receive column j is only affected by capacitance pixels in column j.

The example capacitive touch panel 800 includes a touch panel 802, a transmit digital to analog converter (TxDAC) 804, transmit buffers 806, 808, 810, 812, and a receive analog to digital converter 814. The transmit buffers 806, 808, 810, 812 each have an associated multiplier 816, 818, 820 822, respectively. The multipliers 816, 818, 820 822 operate to multiply the applied signal from the TxDAC by either +1 or −1.

In the example of FIG. 8, a single TxDAC waveform is sent to all four transmit buffers 806, 808, 810, 812. However, each buffer multiplies this waveform by either +1 or −1 before transmitting it onto the row of the touch panel 802. For a given step scan (indicated by the subscript "step_idx"), each value of $H_{i,step\_idx}$ is held constant. But for subsequent step scans in the scan sequence, these values may change. Therefore, at a given step index, the voltage received at $m^{th}$ Rx channel is:

$$V_{step\_idx,m} = V_{TX} \cdot RxGain_m \sum_{n=0}^{NumRows-1} H_{n,step\_idx} \cdot C_{n,m}$$

where $V_{TX}$ is the amplitude of the transmit signal and $RxGain_m$ is the gain of the receive channel m. In order to simplify the analysis, these two parameters are assumed to be equal to 1 and ignored in subsequent calculations.

As can be seen by this equation above, $V_{step\_idx,m}$ is based on NumRows (e.g., 4) unknown values, $C_{n,m}$, with n=0 to 3 in this example. Therefore, if four independent step scans are performed with four independent H sequences applied to the four transmit buffers 806, 808, 810, 812, the relationship between V and C can be inverted in order to estimate the C values from V. In matrix form, this can be written:

$$V_m = H \cdot C_m$$

$$V_m = \begin{bmatrix} V_{0,m} \\ V_{1,m} \\ \vdots \\ V_{NumSteps-1,m} \end{bmatrix}$$

$$H^{NumSteps,NumRows} = \begin{bmatrix} H_{0,0} & \cdots & H_{0,NumRows-1} \\ \vdots & \ddots & \vdots \\ H_{NumSteps-1,0} & \cdots & H_{NumSteps-1,NumRows-1} \end{bmatrix}$$

$$C_m = \begin{bmatrix} C_{0,m} \\ C_{1,m} \\ \vdots \\ C_{NumRows-1,m} \end{bmatrix}$$

In this formulation, the column vector $c_m$ represents the capacitance of the capacitive pixels in the $m^{th}$ column of the capacitive touch panel. H is a NumSteps×NumRows matrix, where the $n^{th}$ column of the H-matrix represents the multiplicative sequence applied to the $n^{th}$ transmit row. The optional superscript of H indicates the dimensions of the H matrix. $V_m$ is a column vector, where the $n^{th}$ entry in the matrix is the $n^{th}$ step scan output of $m^{th}$ RX channel.

In the present application, H is a special form of matrix, called a modified Hadamard matrix. These matrices have the property that:

$$H^T \cdot H = \text{NumSteps} \cdot I$$

where I is the NumRows×NumRows identity matrix, and $H^T$ is the transpose of H.

Given the formulation above, and the properties of the H-matrix, the relationship from $c_m$ to $v_m$ can be inverted in order to extract out the values of the $c_m$ vector from the $v_m$ measurements. Using the terminology defined above:

$$C_m = \frac{1}{\text{NumSteps}} H^T \cdot V_m$$

In the example above, the panel had four rows and the value of NumSteps (equivalently $N_{multi}$) was also set to four. Therefore, all panel rows were stimulated during every step scan. In general, the number of panel rows will be larger than the value of $N_{multi}$. In that case, the panel stimulation is broken up into blocks. During each block of $N_{multi}$ step scans, $N_{multi}$ adjacent rows are stimulated with the Hadamard polarity sequencing described above.

The heatmap assembly block 414, 420 works on each block of $N_{multi}$ scans independently in order to create the complete heatmap output. For instance, if there were twelve panel rows and $N_{multi}$ were set to four, then the first four step scans would be used to stimulate and assemble the first four rows of the capacitive heatmap; the next four step scans would be for the fifth through eighth panel rows; and the last four step scans would be for the ninth through twelfth rows. Therefore, for each block of $N_{multi}$ rows, the heatmap assembly block operates in the exact same manner as defined above. However, the outputs of the HAB 414, 420 are mapped to the subsequent rows in the complete capacitive heatmap.

The heatmap assembly block 414, 420 is capable of assembling a 32-column-wide heatmap, as there are a total of 32 receiver channels implemented in one embodiment. However, in many cases, the capacitive touch panel used will not have 32 columns, and hence not all 32 receive channels are used.

Mathematical extensions for Asymmetric Panel Scanning

As described above, the controller 104 preferably has the capability to perform asymmetric panel scans, where the firmware supporting operation of the controller 104 has the capability to define the number of times each row is to be scanned. Given the formulation for asymmetric panel scanning outlined above, the changes to the heatmap assembly operation in order to support this feature are minimal.

As described above, the heatmap is assembled in a blocks of $N_{multi}$ rows. In asymmetric scanning, $N_{multi}$ can vary on a block-by-block basis. Therefore, the old equation of:

$$C_m = \frac{1}{\text{NumSteps}} H^T \cdot V_m$$

is still valid. However, with asymmetric scanning, the dimensions of C, V, and H and the value of NumSteps change on a block-by-block basis.

The I/Q combiner 422 shown in 4 is used to combine the I- and Q-channel heatmaps into a single heatmap. The primary output of the I/Q combiner 422 is a heatmap of the magnitude (e.g., $\text{Sqrt}[I^2+Q^2]$). This is the heatmap that is handed off to the touch back end 134.

The row/column normalizer 424 shown in FIG. 4 is used to calibrate out any row-dependent or column-dependent variation in the panel response. The row/column normalizer 424 has two static control input vectors, identified as RowFac and ColFac. RowFac is an Nrow-by-1 vector, where each entry is 1.4 unsigned number (e.g., LSB=$\frac{1}{16}$. Range is 0 to 31/16). ColFac is an Ncol-by-1 vector, where each entry has the same dimensions as RowFac.

If the input data to the Row/Column Normalizer block is labeled as Heatmapin(m,n), where m is the row index and n is the column index, the output of the block should be:

HeatmapOut(m,n)=heatmapIn(m,n)·RowFac(m)·ColFac(n)

In one embodiment, the controller 104 has the capability to allow RowFac and ColFac to be defined either by OTP bits or by a firmware configuration file. The OTP settings will be used if the manufacturing flow allows for per-module calibration, thus enabling the capability to tune the controller 104 on a panel-by-panel basis. If RowFac and ColFac can only be tuned on a per-platform basis, then the settings from a firmware configuration file will be used instead.

Spectrum Estimation

The spectrum estimation preprocessor 432 operates to determine the background levels of interference that couple into the receive channels 406 so that the controller 104 may appropriately select transmit frequencies that are relatively quiet or interference free.

The spectrum estimation preprocessor 432 will generally only be used during spectrum estimation mode (SEM), so it is not part of the standard panel-scan methodology. Instead, the spectrum estimation preprocessor 432 will be used when conditions indicate that SEM should be invoked. At other times, the spectrum estimation preprocessor 432 can be powered down.

Baseline Tracking and Removal Filter

A touch event should be reported when the measured capacitance of a capacitive pixel (or group of pixels) changes by a large enough amount in a short enough period of time. However, due to slow environmental shifts in temperature, humidity or causes of drift, the absolute capacitance of a pixel (or group of pixels) can change substantially at a much slower rate. In order to discriminate changes in pixel capacitance due to a touch event from changes due to environmental drift, a baseline tracking filter can be implemented to track the changes in the baseline (e.g., "untouched" or "ambient" value of the capacitance), and simple subtraction of the baseline capacitance from the input capacitance will yield the change in capacitance due to the touch event.

Figure 9:
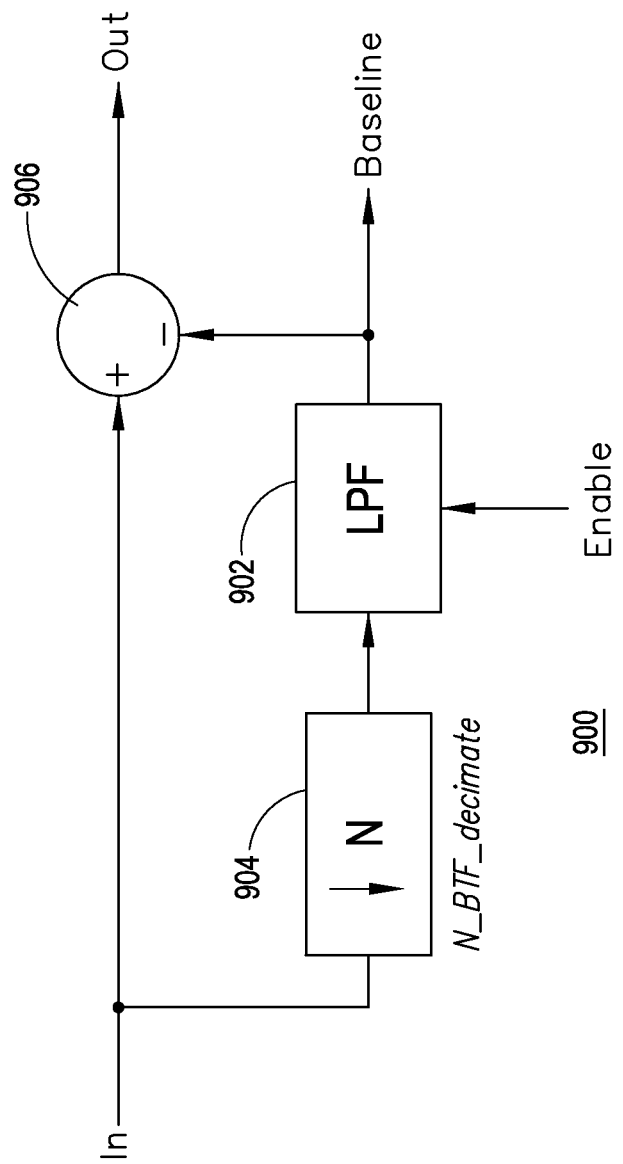
FIG. 9 illustrates an exemplary baseline tracking filter for use in a controller circuit for a portable device.

FIG. 9 illustrates a baseline tracking filter 900. The filter 900 includes a low-pass filter (LPF) 902, a decimator 904 and a combiner 906. The input signal to the filter 900 is provided to the combiner 906 and the decimator 904. The output signal of the decimator is provided to the input of the LPF 902. The output of the LPF 902 is combined with the input signal at the combiner 906. The LPF 902 has an enable input for controlling operation of the filter 900.

The LPF 902 in the baseline tracking filter 900 is used to improve the estimate of the baseline capacitance value. One embodiment uses a simple finite impulse response (FIR) moving average filter of length N (aka "comb filter"), such as:

$$H_N(z) = \frac{1}{N} \cdot \frac{1-z^{-N}}{1-z^{-1}} = \frac{1}{N} \cdot \sum_{n=0}^{N-1} z^{-n}$$

Another embodiment a 1-tap infinite impulse response (IIR) filter, also referred to as a modified moving average, with response:

$$H_k(z) = \frac{\frac{1}{k}}{1-\left(1-\frac{1}{k}\right)z^{-1}}$$

The FIR embodiment of the filter 902 may be used upon startup and recalibration of the baseline value, as it can quickly acquire and track the baseline value. The IIR embodiment of the filter 902 should be used once the baseline value is acquired, as it can be a very computationally efficient means to implement a low-pass filter, particularly if k is chosen to be a power of 2. By increasing the value of k, one can set change the signal bandwidth of the filter to arbitrarily small values with minimal increase in computational complexity.

Filter 900 has two outputs, labeled "Out" and "Baseline" in FIG. 9. The Baseline output is the estimate of the current baseline (aka "ambient" or "untouched") capacitance of the particular panel pixel(s) being scanned, and the "Out" output is the baseline-corrected value of that capacitance measurement. The "Out" value is what should be used in the subsequent touch-detection logic.

The LPF 902 in FIG. 9 has an enable signal in order to shut down the LPF 902 when a touch event is detected. This is provided so that the baseline output is not corrupted by spurious data, most likely from a touch event. If the enable signal is low, the LPF 902 will hold its previous output without updating its output with the incoming data, effectively ignoring the incoming data. Once the enable signal is high, the LPF 902 will continue to update its output with the incoming data. Logic for generating the enable signal is detailed in the following equation:

Enable=(Out≤PosLPFThresh)&&
(Out≥NegLPFThresh)

where PosLPFThresh and NegLPFThresh are configurable parameters.

In a mutual-capacitance scan mode, where a touch event causes a reduction in the input data, the NegLPFThresh should be set to $k_T$*TouchThresh, where $0<k_T<1$ and Touch-Thresh is the touch-detection threshold defined below. These may both be programmable parameters. In a mutual-capacitance scan mode, there is no expected physical mechanism that would cause the input data to exhibit a positive transient. Therefore, PosLPFThresh may be a programmable parameter used to filter out spurious data, should an unexpected positive transient occur.

Programmable Update Rate

The timescale of most baseline drift phenomena will be far slower than the frame rate of the touch panel scan. For instance, observed baseline drift devices had timescales on the order of 1 hour or longer, whereas the frame rate of a current device may be on the order of 200 frames/second. Therefore, in order to reduce the computation for baseline tracking, the controller circuit 104 shall have the capability to scale the update rate of the baseline tracking filter 900. The device may do this by using the decimator 904 to decimate the data fed to the filter 900, so that the filter 900 only operates on every N_BTF_decimate frames of heatmap data, where N_BTF_decimate is a programmable parameter. Therefore, the Baseline signal in FIG. 9 will update at this slower rate. However, the baseline corrected output signal ("Out" in FIG. 9) may be calculated for every frame.

Baseline tracking needs to exercise special care when spectrum estimation mode (SEM) is invoked. SEM may cause a configuration change in the analog front end which in turn will alter the gain in the transfer function (e.g., from capacitance values to codes) of the touch front end. This, in turn, may cause abrupt changes in the capacitive heatmap to occur that could be accidentally interpreted as touch events.

A touch event is detected when the baseline-corrected output exhibits a significant negative shift. The shift in this output may be larger than a programmable parameter, called Touch-Thresh. Furthermore, since the controller circuit 104 may scan a panel at upwards of 200 Hz and a human finger or metal stylus moves at a much slower timescale, a programmable amount of debounce, dubbed TouchDebounce, should also be included. Therefore, before a touch is recognized, the output of the baseline filter may be more negative than TouchThresh for at least TouchDebounce frames. It is likely that TouchDebounce will be a small value, in order that the total touch response time is faster than 10 ms.

Heatmap Noise Estimation

Figure 10:
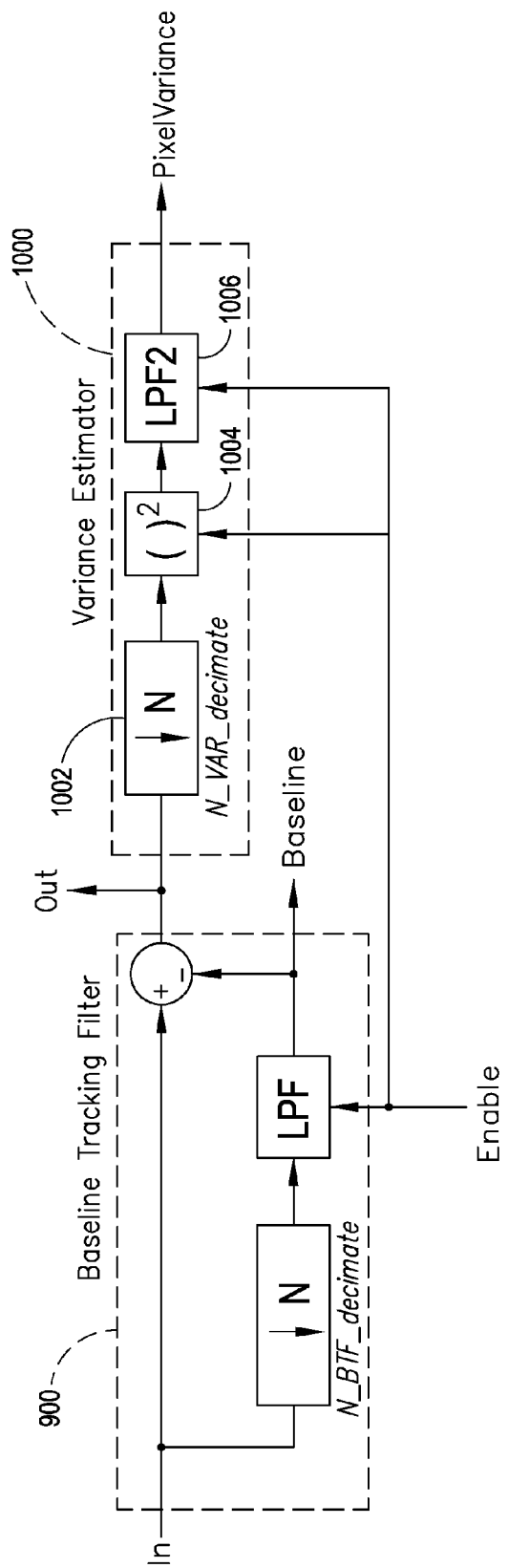
FIG. 10 shows an exemplary first variance estimator in conjunction with the baseline tracking filter of FIG. 9.

The touch back end 134 may use an estimate of the noise level in the capacitive touch panel 102 in order to properly threshold the touch blobs during the detection process. The noise level can be detected by observing noise at the output of the baseline tracking filter as shown in FIG. 10. FIG. 10 shows a first variance estimator 1000 in conjunction with the baseline tracking filter 900 of FIG. 9. In FIG. 10, the baseline tracking filter 900 has its Out output coupled to an input of the variance estimator 1000. The variance estimator 1000 includes a decimator 1002, a signal squarer 1004 and a low-pass filter 1006. The variance estimator 1000 in this embodiment is simply a mean-square estimator, as the output of the baseline tracking filter 900 is zero-mean. Hence the mean-square is equal to the variance.

In order to lower the computational requirements for the variance estimator 900, the data entering the variance estimator can be decimated in the decimator 1002 by the factor, N_VAR_decimate. The low-pass filter 1006 in the variance estimator 1000 may either be a comb-filter or a modified-moving-average filter. The length of the response of the filter 1006 may be a programmable parameter, averaging data over as many as 100 or more frames. In order to lower memory requirements, the MMA filter may be preferred.

As with the baseline tracking filter 900, the LPF 1006 in the variance estimator 1000 has an input for an enable signal. The enable signal is low when the pixel in question is being touched. Otherwise, the variance estimate may be corrupted by the touch signal. When the enable signal is low, the LPF 1006 should retain state, effectively ignoring the data coming into the variance estimator 1000.

The output of the variance estimator 1000 is the variance of one single pixel in the capacitive touch panel 102. Therefore, this provides an independent variance estimate of each pixel in the panel. To get an estimate of the variance across the panel 102, the controller circuit 104 may average the per-pixel variances across the entire frame.

Figure 11:
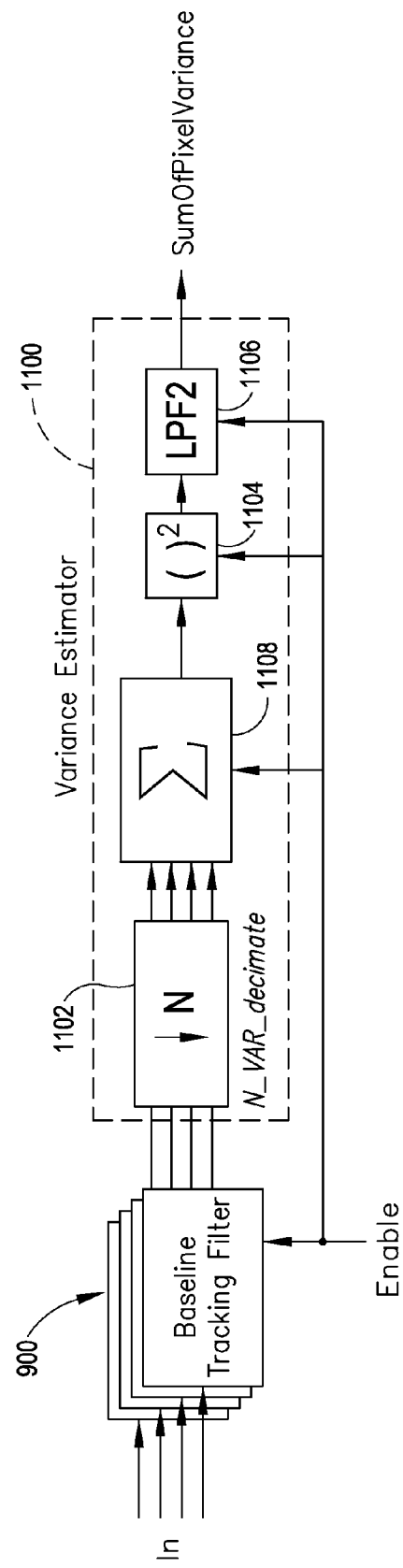
FIG. 11 shows an exemplary second variance estimator in conjunction with the baseline tracking filter of FIG. 9.

Alternately, if only a single per-frame variance estimate is needed, the controller circuit 104 can follow the approach shown in FIG. 10. FIG. 11 shows a second variance estimator 1100 in conjunction with the baseline tracking filter 900 of FIG. 9. In FIG. 11, all the per-pixel baseline tracking filters are grouped as baseline tracking filters 900, on the left in the figure. All the baseline-corrected outputs from the baseline tracking filters 900 are passed to the variance estimator 1100.

Like the variance estimator 1000 of FIG. 10, the variance estimator 1100 includes a decimator 1102, a signal squarer 1104 and a low-pass filter 1106. The variance estimator 1100 further includes a summer 1108. The variance estimator 1100 combines the outputs of the baseline tracking filters 900 into a single value by summing the baseline-corrected outputs across the entire frame in the summer 1108. This averaged value is then passed to the same square-and-filter estimator that was described above, formed by the signal squarer 1104 and the low-pass filter 1106. Assuming that the noise is uncorrelated from pixel-to-pixel, the output of the variance estimator 1100 is equal to the sum of all the pixel variances reported by the block diagram in FIG. 10. In order to generate the average pixel variance across the panel, this result may be divided by the total number of pixels in the capacitive touch panel 102. To generate an estimate of the standard-deviation of the noise, the controller circuitry 104 may take the square root of the variance.

In one implementation, the controller circuit 104 implements orthogonal multi-row stimulation of the touch panel. One specific example is described with reference to FIG. 12 in the context of a smartphone 1200 (although the techniques may be implemented in any device with a touch panel). The smartphone 1200 may include a transceiver 1202 and the control circuitry 104, including one or more processors 1204, a memory 1206, a touch panel interface 1228, and a user interface 1208. The transceiver 1202 may be a wireless transceiver, and the transmitted and received signals may adhere to any of a diverse array of formats, protocols, modulations, frequency channels, bit rates, and encodings Thus, the transceiver 1202 may support the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 1204 executes the touch positioning logic ("TPL") 1210 according to the TPL parameters 1218. The TPL 1210 may be part of an operating system, an application program, firmware, or other logic. The user interface 1208 includes a capacitive touch panel 1212 which is divided into a grid of rows 1214 and columns 1216 (and as also shown, for example, in FIG. 3). For the sake of illustration, the transmitters are connected to the rows 1214 and the receivers are connected to the columns 1216, however, that arrangement may be reversed. At each intersection of row and column (referred to as a pixel), there is a capacitance that is impacted by the presence or absence of a finger, stylus, or any other conductive touching object. The capacitance value at each pixel provides the "heat map" of capacitance across the touch panel 1212, and may be envisioned as a contour map of the touch panel 1212 in which the values are the capacitance values at each pixel. In some implementations, the system may perform analysis based on raw capacitance values or delta capacitance values. Because the measured raw capacitance of a pixel generally decreases with the presence of a conductive touching object, delta capacitance can represent the difference between the measured raw capacitance value when the touch panel 1212 is not touched and the measured raw capacitance value when the touch panel 1212 is touched. Thus, while the raw capacitance value may decrease in the presence of a touch, the delta capacitance will increase. In the discussion below, the term "capacitance" may be used instead of "delta capacitance."

Traditionally, to obtain the capacitance value at each pixel, each row of the touch panel 1212 is sequentially energized (one at a time) by its transmitter, and the receivers across the row, for each column, determine the capacitance values for the pixels in the energized row. Thus, the touch panel 1212 is scanned one row at a time. Accordingly, if there are 'n' rows, it takes 'n' scans to image the entire touch panel 1212. Assuming for the sake of illustration that there is a one millisecond time window in which to image the entire touch panel 1212 (for a frame rate of 1000 frames per second), and there are 10 rows, then each row may get energy for $\frac{1}{10}$th of a millisecond. If a faster frame rate is desired, then the duration of each row scan may be reduced to less than $\frac{1}{10}$th of a millisecond. Doing so, however, may decrease the signal to noise ratio (SNR) because less time is spent sending power into any particular pixel.

Figure 13:
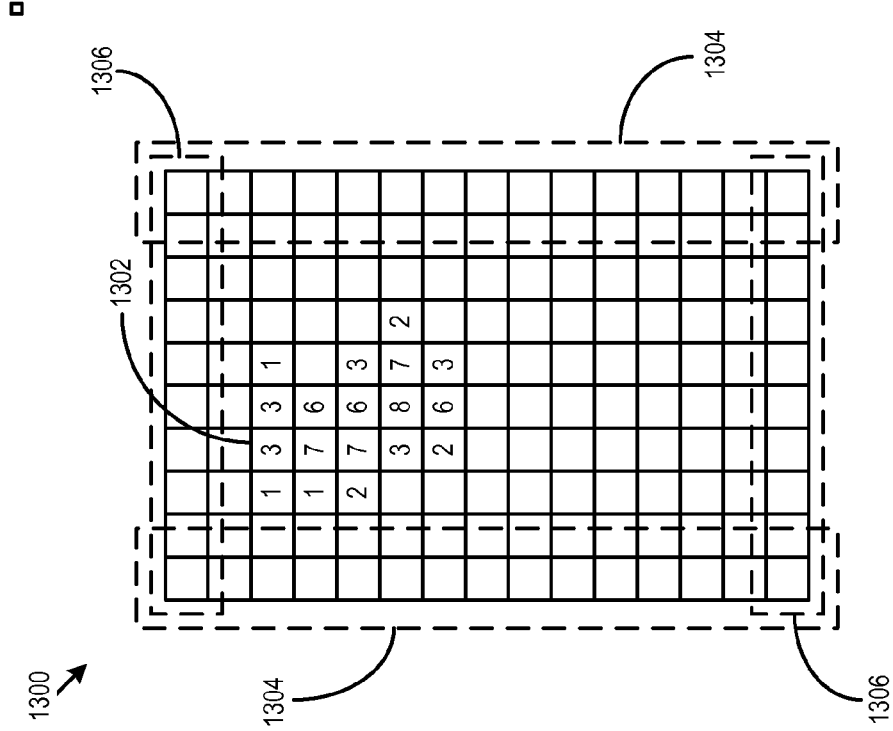
FIG. 13 shows an exemplary touch panel blob.

Each area where the circuitry 104 detects, through the touch panel interface 1228, interaction with the touch panel 1212 may show as increased capacitance values in that area of the touch panel 1212. In some implementations, if the system is using raw capacitance values, as described above, the touch interaction may show as a decrease in raw capacitance. Such areas are referred to as "blobs" due to the generally, but not necessarily, irregular shape of the heat map of capacitance values across multiple pixels at or near where an interaction with a finger or stylus (as examples) is occurring. FIG. 13 shows an example of a frame 1300 read from the touch panel 1212 currently being interacted with. The reading of the frame 1300 reveals the blob 1302. The capacitance values of the pixels in the blob 1302 are noted in the frame 1300. The values are for illustration only and are not meant to be representative of actual measurements. The touch panel 1212 may register multiple blobs, which allows the control circuitry 104 and or processor 122 to monitor simultaneous touch interactions with the touch panel. Each blob's position, movement, and persistence on the touch panel can be tracked by the control circuitry 104.

When an interaction with a finger or stylus (as examples) causes a blob to be detected, this is called a touch. For each valid touch, accurate position information should be maintained regardless of the number of simultaneous touches, regardless of the touch's location on the touch panel, and regardless of the distance between any nearby touches. Determining an accurate position can be difficult, given the coarseness of the pixel grid. Further, depending on the characteristics of the blob, the calculated position may be inaccurate. This inaccuracy is due to certain characteristics of the blob, such as which pixels are members of the blob, whether the blob is near the edge or corner of the device, whether the blob is near other touches, or whether the blob is moving across the panel.

The TPL 1210 provides several advantages:

Because a touch, and its resulting blob, may occur at or move to a variety of locations on the frame 1300 (FIG. 13), the TPL 1210 (FIG. 12) may accurately identify the location of the touch and report it to the control circuitry 104 and/or the processor 122 (FIG. 1). The TPL 1210 uses the characteristics of the blob to determine its location. Generally, this is accomplished by determining, for each touch, which pixels should be a member of that touch's blob and then calculating the centroid of the blob, using a characteristic of the blob such as the capacitance values of the pixels that are members of the blob. The capacitance values can have both a positional component and a magnitude component.

In addition, the host may request or require that the control circuitry 104 filter out unintentional touches from being reported to the host, or to any other processing logic that uses the touch information from the touch panel 1212. Accordingly, the TPL 1210 facilitates correct positioning of the touch and intelligent action based on the reported position.

The TPL 1210 may employ the following processing techniques, implemented in hardware, software, or both:

Determining blob membership: To provide accurate centroid calculations, the TPL 1210 determines whether a pixel should be a member of the blob by using a member-identifying threshold and a touch-reporting threshold. The blob is formed from connected pixels whose capacitance values exceed the member-identifying threshold. In order for a pixel to be a member of the blob, the TPL 1210 can determine that the pixel is contiguous to another member pixel and has a capacitance value that exceeds the member-identifying threshold. For example, the TPL 1210 can use an iterative process to determine blob members, starting with a member pixel and evaluating the eight nearest neighbors, where the eight nearest neighbors are those pixels that are contiguous with the member pixel. For each pixel that is included as a member, the eight nearest neighbors of each member can also be evaluated for membership in the blob. This process may continue until no additional members of the blob are found in the connected pixels.

The member-identifying threshold is not necessarily fixed, but it may change dynamically, depending on the noise floor reported to the TPL 1210. The member-identifying threshold values may be part of the TPL parameters 1218. The processor 122 (FIG. 1) can use the reported noise floor estimate, which is the noise floor estimate of the touch panel 1212 measured when no touches are present. The TPL 1210 can multiplied the noise floor by a scalar value and add it to a constant in order to setting the member-identifying threshold value. Because the TPL 1210 uses the member-identifying threshold adapted to the noise conditions, pixels that are not associated with the touch event can be excluded from membership in the blob.

Once the member-identifying threshold is used to determine the members of the blob, the TPL 1210 utilizes the touch-reporting threshold. The touch-reporting threshold establishes a minimum capacitance value that is required in order for the TPL 1210 to begin reporting that blob to the control circuitry 104 and/or the processor 122, indicating that at least one valid touch has occurred. If no pixel of the blob has a capacitance value that exceeds the touch-reporting threshold, the TPL 1210 does not report the blob as a valid touch to the control circuitry 104 and/or the processor 122. If at least one pixel of the blob exceeds the touch-reporting threshold, the TPL 1210 determines the local maxima of the blob. The local maxima that exceed the touch-reporting threshold are called "peaks." For each peak, the TPL 1210 reports the peak as a valid touch to the control circuitry 104 and/or the processor 122. In one implementation, the TPL 1210 determines whether there are more than five local maxima in a single blob. If so, the TPL 1210 may disregard the blob by not reporting any valid touches to the control circuitry 104 and/or processor 122. This helps reject false or unintended touches, such as when an entire hand is accidentally pressed against the touch panel 102. The local maxima reporting threshold may be set to any number other than five, depending on the implementation, and the local maxima reporting threshold may be set as one of the TPL parameters 1218.

The touch-reporting threshold value is set to a selected value above the noise floor. The selected value may be set empirically to a level that rejects noise and interference from incorrectly registering as a touch when there has been no interaction with the frame 1300 (FIG. 13). The selected value may change during operation of the device 100, or before operation of the device 100. For example, the touch-reporting threshold value can be provided to the TPL 1210 by the host processor 106 (FIG. 1), and saved as one of the pre-determined TPL parameters 1218 in the smartphone device 1200. In other implementations, the touch-reporting threshold can be updated by the processor 122 to reflect configuration changes to the AFE 700 (FIG. 7), changes such as stimulating the touch panel 102 with a different transmit frequency.

Once the members of the blob have been determined and at least one local maximum exceeds the touch-reporting threshold, the TPL 1210 can calculate the centroid of the blob, using the capacitance values of all the members of the blob. Generally, when the blob has only one local maximum that exceeds the touch-reporting threshold (i.e., one peak) the TPL 1210 can use all of the members of the blob to calculate the centroid of the blob. If the TPL 1210 identifies more than one peak in the blob, the TPL 1210 can report each peak as a valid, independent touch to the control circuitry 104 or processor 122. Or, if the TPL 1210 identifies more than one peak in the blob, the TPL 1210 can report as independent touches those peaks that are separated by a certain number of pixels. For example, if two peaks are separated by only four pixels, the TPL 1210 may report only the higher of the two peaks as a single touch and forgo reporting the lower of the two peaks as an independent touch. It should be noted, however, that any amount of pixel separation may be used.

Additionally, if the TPL 1210 identifies more than one peak in the blob and reports each peak as an independent touch, the TPL 1210 may use a windowing technique when calculating the centroid of the blob. The windowing technique limits the member pixels used in calculating the centroid of the blob to a certain window of pixels around each peak. As one example, the window may be a three-by-three grid of pixels centered on the peak. It should be noted, however, that a window of any size or shape can be used for limiting membership, including, for example, a four-by-four, three-by-four, or a five-by three window. Instead of or in addition to windowing, the TPL 1210 can use a close touch discrimination technique to apportion the capacitance between two or more peaks of a blob that are reported as independent touches. The TPL 1210 may use the close touch discrimination technique when there are only two peaks in a blob. The close touch discrimination technique, described in detail below, may be applied to two peaks of a single blob, each peak being reported as an independent touch and whose membership has been limited to a subset of the blob. In some implementations, when the TPL 1210 finds three or more peaks in the blob, then the TPL 1210 does not use the close touch discrimination techniques described below, but it does use the windowing technique around each peak to quickly locate each of the multiple peaks in the blob. However, in other implementations, the TPL 1210 may perform additional processing beyond the windowing technique to try to improve the location estimate for each peak when there are three or more peaks.

Figure 14:
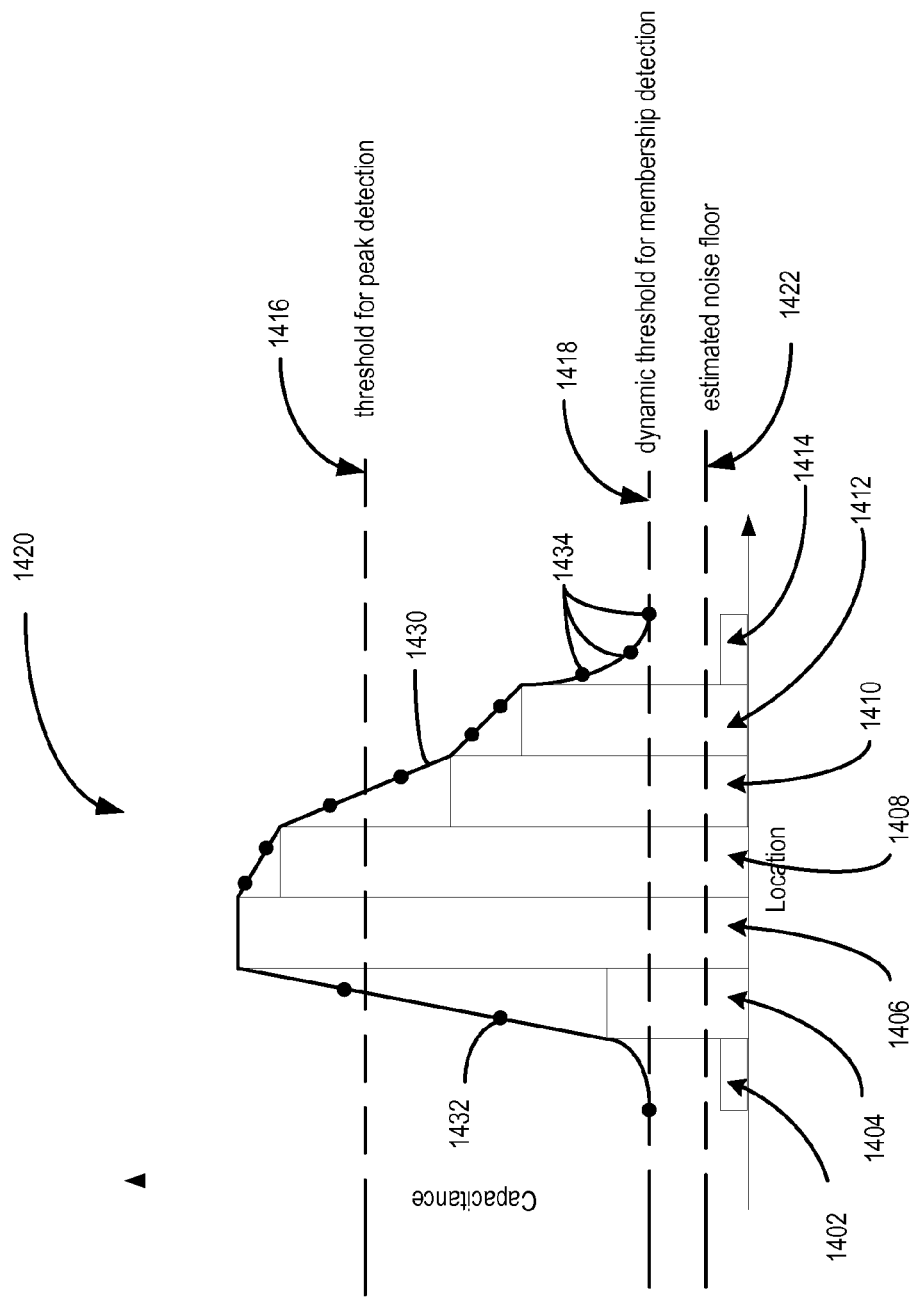
FIG. 14 shows a two-dimensional view of the capacitance of an exemplary touch panel blob.

FIG. 14 illustrates a touch 1420 in the form of a two-dimensional graph, with the location of the pixel relative to the frame 1300 (FIG. 13) on the x-axis and the capacitance value on the y-axis. (For simplicity, the graph represents two-dimensional data associated with a blob, when, in practice, the processed data may have additional dimensions.) As described above, the touch-reporting threshold 1416 establishes a minimum capacitance value that is required to begin reporting that a valid touch has occurred. This touch-reporting threshold value is set to some value above the estimated noise floor 1422. Because pixel capacitance 1406 is above the touch-reporting threshold 1416, the TPL 1210 (FIG. 12) determines whether to include the surrounding pixel capacitances 1402, 1404, 1408, 1410, 1412 as members of the touch's blob. The TPL 1210 (FIG. 12) uses the member-identifying threshold 1418 to determine whether to include surrounding pixels. Because surrounding pixels 1402 and 1414 are below the member-identifying threshold 1418, the TPL 1210 excludes them from membership in the blob.

Interpolation of capacitance values between pixels: The TPL 1210 may utilize an interpolation algorithm to enhance the characteristics of the blob. Given the coarseness of the heatmap, it may be advantageous to perform interpolation between capacitance values of each pixel that is a member of the blob. Interpolated values of capacitance can be added to the centroid calculation to more accurately calculate the centroid of the blob and thereby determine a more accurate position of the touch. Any type of interpolation can be used, such as bilinear interpolation. Referring to FIG. 14, interpolated values 1432 and 1434 are shown along the interpolated curve 1430. The TPL 1210 (FIG. 12) can use these additional values when calculating the centroid of the blob. In one implementation, rather than interpolating the values between every pixel in the blob, the TPL 1201 interpolates the capacitance values at the outer edge of the blob for inclusion in the centroid calculation. This is performed by interpolating values between the outermost members of the blob and the member-identifying threshold 1418. Referring again to FIG. 14, interpolated values 1434 are calculated between the outermost pixel value 1412 of the blob and the member-identifying threshold 1418. By including these interpolated capacitance values, the outer edges of the blob are more accurately extended down to at least the member-identifying threshold described above. This implementation also allows for faster processing because the interpolation can be done as part of the centroid calculation, and no additional memory is need to store the interpolated values of the blob.

Figure 12:
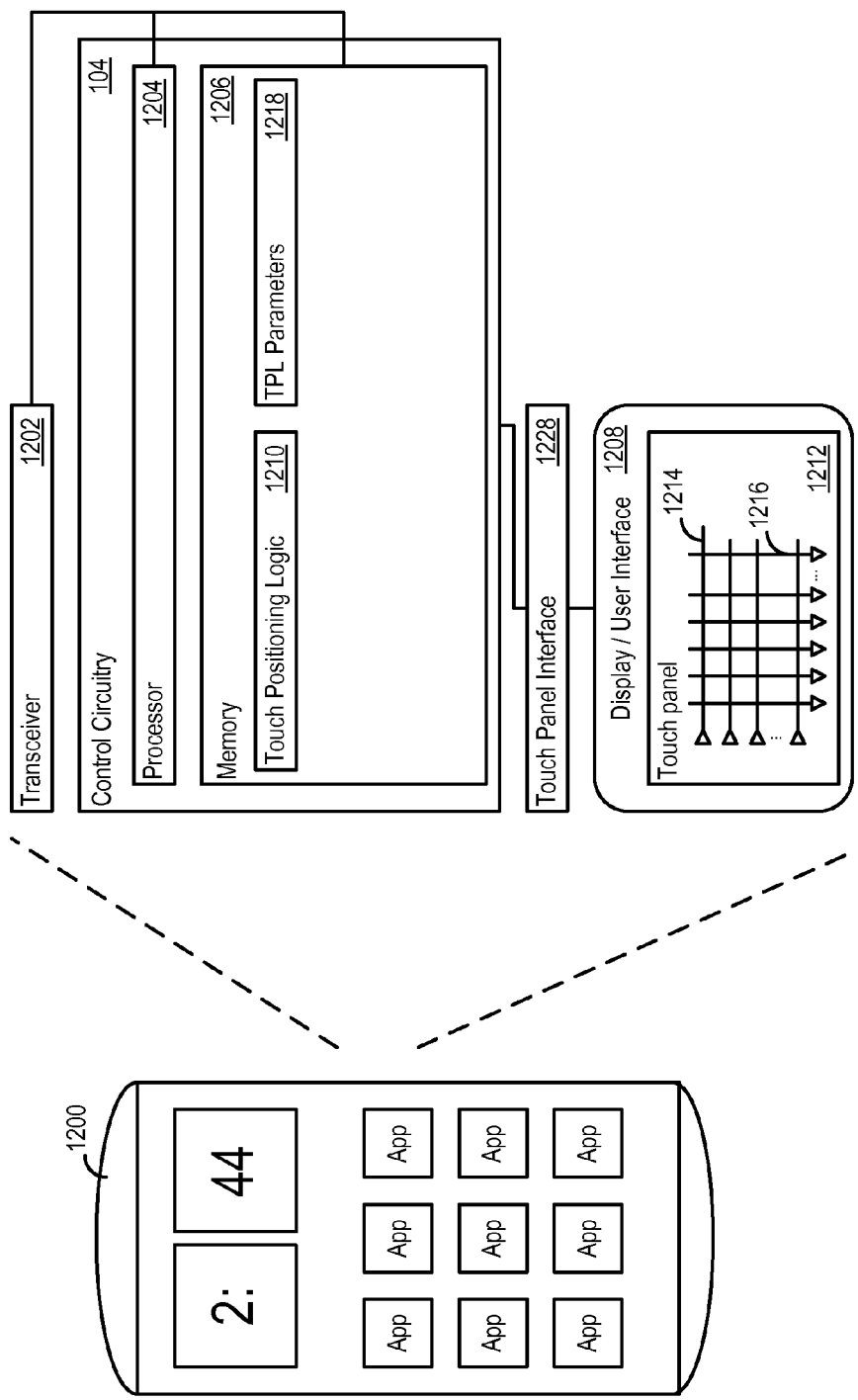
FIG. 12 shows an exemplary portable device that employs touch positioning logic.

Accurate positioning for touches near the edge of the touch panel: The TPL 1210 may examine characteristics of the touch blob to determine if the touch is near the edge of the touch panel. The TPL 1210 may use the location of the peak pixel of the blob to determine whether the blob is near the edge of the touch panel. In one implementation, if the peak pixel of the blob is located in an edge row and/or edge column of the touch panel 1212, then the TPL 1210 can determine that the blob is located near the edge of the touch panel. Referring to FIG. 13, edge row pixels 1306 and edge column pixels 1304 are outlined by the dashed boxes. In other words, these edge pixels are the outermost pixels of frame 1300. Even though the outermost pixels of frame 1300 are illustrated as the edge pixels, it should be recognized that any pixel near the edge of frame 1300 may be considered an edge pixel. Additionally, a touch near the edge of the panel may result in lower overall capacitance for the blob, which can alert the TPL 1210 that the touch may be near the edge of the touch panel. As can be seen in FIG. 13, the edges of blob 1302 are contained within frame 1300 of the touch panel 1212 (FIG. 12). Using the illustrative capacitance values outlined in FIG. 13, the blob has a total capacitance value of seventy-one (71) when summing the individual capacitance values of the member pixels in the blob 1302. However, if blob 1302 were to move near the edge of the frame 1300, a portion of blob 1302 might not be measured because a portion of blob 1302 may be outside of frame 1300. A pixel capacitance value cannot be directly measured outside the frame 1300 because there are no capacitive sensors outside the frame area.

Figure 15:
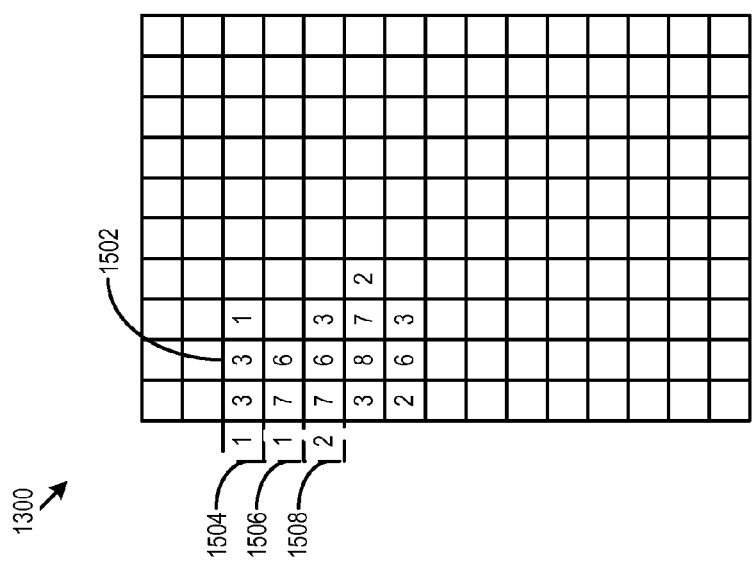
FIG. 15 shows an exemplary touch panel blob when the touch is near the edge of the touch panel.

This situation is shown in FIG. 15, where blob 1502 has moved close to the edge of the frame 1300. Because a portion of the blob is outside of the frame 1300, the total capacitance value of blob 1502 is sixty-seven (67). Pixels 1504, 1506, and 1508 are not part of frame 1300, and the capacitance that would normally be included in blob 1502 is therefore not included. Because non-measured pixels 1504, 1506, and 1508 are not included in the calculation of the centroid of the blob 1502, the position may become inaccurate.

In order to improve accuracy, the TPL 1210 can estimate the capacitance value and location of additional capacitance that may not have been measured by the frame 1300. If the total capacitance of the blob drops to an amount lower than expected for the characteristics of a given blob, the TPL can extrapolate to "virtual" pixels to be included in the calculation of the centroid of the blob. These are called "virtual" pixels because they do not appear on the heatmap of the frame 1300 (they are not pixels corresponding to actual physical capacitance sensors). For example, if blob 1502 is expected to have a total capacitance of seventy-one (71) while the measured capacitance is sixty-seven (67), the TPL 1210 may apportion the remaining four (4) units of capacitance to virtual pixels in rows and/or columns that extend beyond the physical limits of frame 1300. Using the peaks, area, curvature, and/or motion vector of blob 1502, the TPL 1210 can estimate how much capacitance to apportion to which virtual rows and/or columns.

One method for apportioning the virtual capacitance is for the TPL 1210 to distribute the virtual capacitance evenly among the pixels of a virtual row and or column in proportion to the maximum number of pixels in the rows or columns of the measured blob. By way of example, if a measured blob has a maximum count of four pixels for any given column, as the blob nears the edge of the frame 1300 and its capacitance drops lower than expected, the TPL 1210 can evenly distribute the virtual capacitance to the four pixels in the virtual column, where the four pixels are located in the same rows as the measured blob 1502. Further, instead of evenly distributing the virtual capacitance among the four pixels, the TPL 1210 could weight the distribution of capacitance within the virtual column based on the relative magnitudes of total capacitance in each row of the measured blob. Thus, the TPL 1210 could apportion a higher portion of the virtual capacitance to a virtual pixel in a first row where the measured capacitance of the blob's first row is higher than that of the blob's second row. Additionally, the motion vector of the blob can be used to weight the virtual pixels and project the path of the blob. Because blob characteristics such as total capacitance and motion are tracked by the control circuitry 104, the TPL 1210 can use these expected values to distribute the virtual capacitance to virtual rows/columns. Where the historical characteristics of the blob are unavailable, fixed characteristics set by the host 106 can be used by the TPL 1210 for distributing the virtual capacitance to virtual rows/columns. Once the capacitance is distributed to virtual pixels in the virtual rows/columns, the TPL 1210 can include the virtual pixels as members of the blob 1502. Then, when the processor calculates the centroid of the blob, the capacitance values of the virtual pixels 1504, 1506, and 1508 are included in the calculation. In this manner, the TPL 1210 is able to accurately determine the position of the blob, even when near the edge of the panel.

Figure 16:
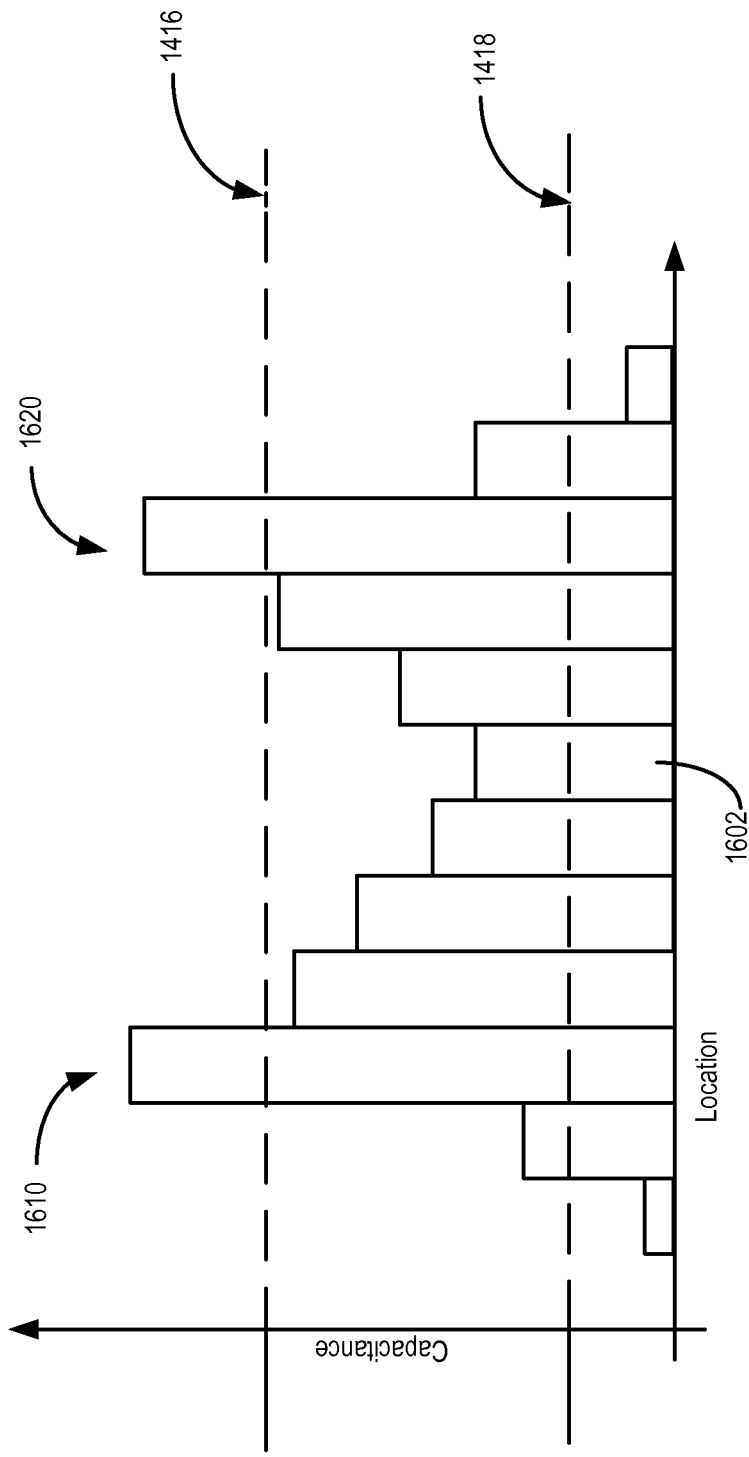
FIG. 16 shows a two-dimensional view of the capacitance of two exemplary touch panel blobs in close proximity.

Close touch discrimination: As described above, the control circuitry 104 may need to report the location of multiple blobs, due to multiple touches on the panel 1212. Or, as described above the TPL may identify multiple peaks within a single blob, and report each peak as an individual touch, even though each peak is within the same blob. The TPL 1210 may identify the number of touches and then determine the location of each touch. When multiple blobs are in close proximity to one another or when multiple touches are located within the same blob, it is possible that certain pixels may need to be shared by the multiple blobs. In effect, the multiple blobs overlap, and a single pixel may be a member of more than one blob. Or, in other words, individual touches may be close enough so that a single blob is formed having multiple peaks. If pixels need to be shared by the multiple blobs (or touches), the TPL 1210 may examine the characteristics of the multiple touches to determine how to apportion the capacitance of the overlapping pixels. FIG. 16 illustrates two touches in the form of a two-dimensional graph, with the location of the pixel relative to the frame 1300 (FIG. 13) on the x-axis and the capacitance value on the y-axis. (For simplicity, the graph represents two-dimensional data associated with a blob, when, in practice, the processed data may have additional dimensions.) The first touch 1610 is close in proximity to a second touch 1620 such that they overlap. The pixel associated with pixel capacitance 1602 may be a member of both the first touch 1610 and second touch 1620. Inaccurate location calculations may result if the pixel capacitance 1602 is used by only one of the touches. In order to accurately calculate the location of each touch, the TPL 1210 may properly apportion pixel capacitance 1602 between the first touch 1610 and the second touch 1620.

Figure 17:
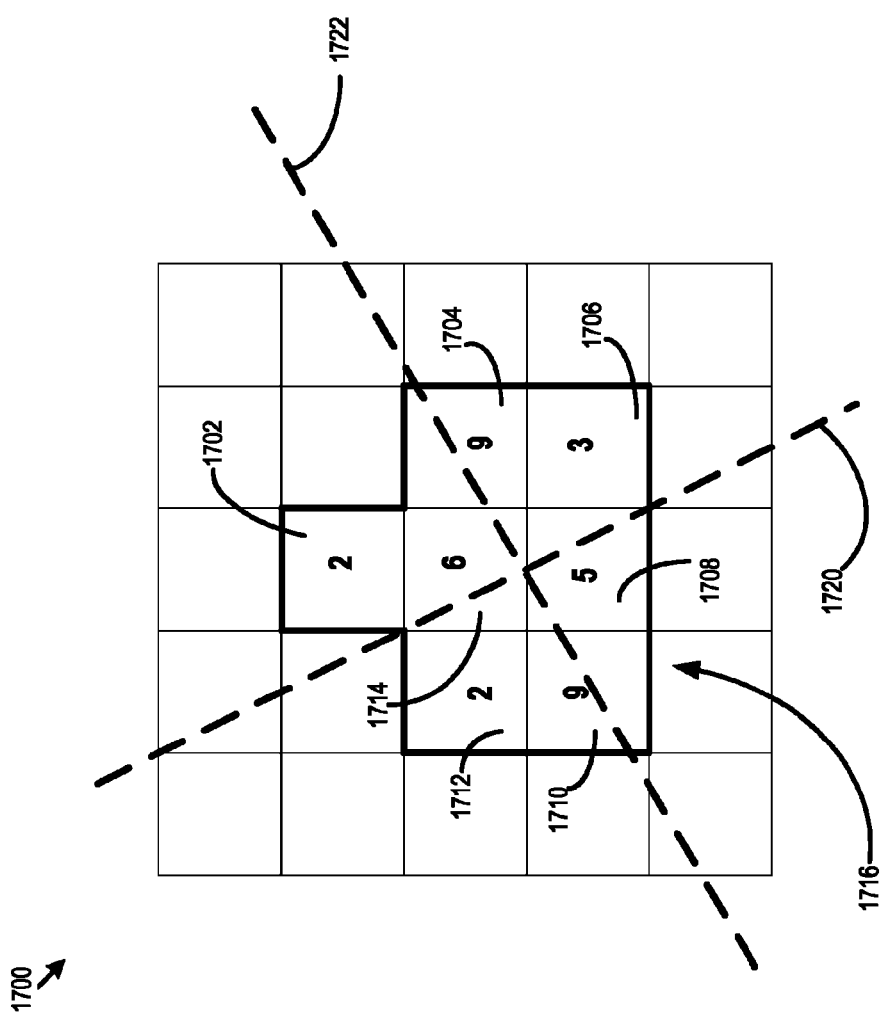
FIG. 17 shows two exemplary touch panel blobs in close proximity.

In one implementation, the TPL 1210 may apportion the shared pixel capacitance by distributing the shared capacitance relative to the pixel's distance from each peak of each blob. Referring to FIG. 17, it shows a portion of a frame 1700, in which two overlapping blobs 1716 are outlined. The capacitance values of the pixels comprising the two overlapping blobs 1716 are noted in the frame 1700. The values are for illustration only and are not meant to be representative of actual measurements. The first blob has a peak pixel 1710 with member pixels 1712, 1714, and 1708. The second blob has a peak pixel 1704 with member pixels 1702, 1704, 1706, 1708, and 1714. Because the first blob shares member pixel 1708 and member pixel 1714 with the second blob, the TPL 1210 (FIG. 12) may apportion the capacitance appropriately between the first and second blobs.

To apportion the capacitance between the first and second blobs, the TPL 1210 (FIG. 12) can estimate the midpoint of a connecting line 1722 that connects the center of a first peak 1710 to the center of a second peak 1704. Even though an angled connecting line 1722 is shown in FIG. 17, to lower the processing requirements of the TPL 1210 (FIG. 12), the connecting line 1722 can be biased as either a purely horizontal or purely vertical line, following the pattern of the frame 1700. The TPL can chose a horizontal line if the two peaks 1710 and 1704 are separated by fewer columns than rows. Alternatively, the TPL can chose a vertical line if the two peaks 1710 and 1704 are separated by fewer rows than columns. Next, using the midpoint of the connecting line 1722, the TPL 1210 (FIG. 12) can estimate a capacitance dividing line 1720 that is orthogonal to the connecting line 1722 at its midpoint. For each shared pixel along the dividing line 1720, the TPL 1210 (FIG. 12) assigns the divided portion of the shared pixel's capacitance to the blob whose peak is located on the same side of the dividing line 1720. In an alternate implementation, the TPL 1210 (FIG. 12) can apportion the shared pixels along the dividing line 1720 based on the relative magnitude of first peak 1710 to second peak 1704 and the distance between first peak 1710 and second peak 1704. Thus, when the processor calculates the centroid of the blob, the apportioned capacitance values of the shared pixels are included in the calculation. In this manner, the TPL 1210 is able to accurately determine the position of the blob, even when two blobs overlap. The processing described above can also be used when more than two touches overlap.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for touch positioning for a touch panel, the method comprising:
scanning a touch panel a first time;
responsive to scanning the touch panel the first time, determining a noise floor for the touch panel;
responsive to the noise floor, determining a member-identifying threshold;
scanning the touch panel a second time;
responsive to scanning the touch panel the second time, determining a touch panel blob resulting from a touch;
determining a member pixel of the touch panel blob based on the member-identifying threshold;
determining a peak pixel of the touch panel blob that exceeds a touch-reporting threshold; and
determining a position of the touch panel blob relative to the touch panel based on the peak pixel and the member pixel.

2. The method of claim 1, further comprising determining a centroid of the blob; and determining the position to be the centroid of the blob.

3. The method of claim 1, where the peak is one of multiple peaks in the touch panel blob; and where determining a position comprises:
   analyzing a window around each of the multiple peaks;
   determining a centroid location for each of the windows; and
   determining a position for each of the multiple peaks as the centroid locations.

4. The method of claim 1, further comprising interpolating based on the member pixel and the peak pixel to generate an interpolated capacitance.

5. The method of claim 1, wherein the member pixel comprises a neighbor pixel to the peak pixel.

6. The method of claim 5, wherein the touch panel blob comprises a contiguous group of neighboring member pixels.

7. The method of claim 1, further comprising:
   determining whether a first pixel is a neighbor pixel of the member pixel;
   when the first pixel in a neighbor pixel of the member pixel, determining whether to include the first pixel in the touch panel blob based on the member-identifying threshold; and
   when the first pixel is not a neighbor pixel of the member pixel, determining whether to exclude the first pixel from the touch panel blob independently of the member-identifying threshold.

8. Control circuitry, comprising:
   a touch panel interface;
   a memory comprising touch positioning logic; and
   a controller in communication with the memory and the touch panel interface, the controller configured, when the touch positioning logic is executed, to:
   scan a touch panel a first time;
   responsive to scanning the touch panel the first time, determine a noise floor for the touch panel;
   responsive to the noise floor, determine a member-identifying threshold;
   scan the touch panel a second time;
   responsive to the scan of the touch panel the second time, determine a touch panel blob resulting from a touch;
   determine a member pixel of the touch panel blob based on, the member-identifying threshold;
   determine a peak pixel of the touch panel blob that exceeds a touch-reporting threshold; and
   determine a position of the touch panel blob relative to the touch panel based on the peak pixel and the member pixel.

9. The control circuitry of claim 8, wherein the controller is further configured to:
   determine a centroid of the blob; and
   determine the position to be the centroid of the blob.

10. The control circuitry of claim 8, wherein the touch-reporting threshold is higher than the member-identifying threshold.

11. The control circuitry of claim 8, wherein the controller is further configured to interpolate based on the member pixel and the peak pixel to generate an interpolated capacitance.

12. The control circuitry of claim 11, where the controller is further configured to assign the interpolated capacitance to a position of the touch panel between the member pixel and the peak pixel.

13. The control circuitry of claim 8, wherein the controller is configured to multiply the noise floor by a scalar to determine the member-identifying threshold.

14. Control circuitry, comprising:
   a touch panel interface;
   a memory comprising touch positioning logic; and
   a controller in communication with the memory and the touch panel interface, the controller configured, when the touch positioning logic is executed, to:
   scan a touch panel a first time;
   responsive to scanning to the touch panel the first time, determine a noise floor for the touch panel;
   responsive to the noise floor, determine a member-identifying threshold;
   scan the touch panel a second time;
   responsive to the scan of the touch panel the second time; determine a touch panel blob resulting from a touch;
   obtain a blob characteristic of the touch panel blob;
   determine a member pixel of the touch panel blob based on the member-identifying threshold;
   determine a peak pixel of the touch panel blob that exceeds a touch-reporting threshold;
   determine a first position of the touch panel blob relative to the touch panel based on the peak pixel and the member pixel;
   when the first position is near an edge of the touch panel, adjust the blob characteristic of the touch panel blob by adding a virtual member pixel to the touch panel blob; and
   determine a second position of the touch panel blob relative to the touch panel based on the blob characteristic.

15. The control circuitry of claim 14, wherein the virtual member pixel is a row member pixel.

16. The control circuitry of claim 14, wherein the virtual member pixel is a column member pixel.

17. The control circuitry of claim 14, wherein the controller is configured to attach the virtual member pixel to the touch panel blob at a blob attachment point.

18. The control circuitry of claim 14, wherein the blob characteristic comprises capacitance.

19. The control circuitry of claim 18, wherein the capacitance comprises a total row capacitance of a particular row in the blob.

20. The control circuitry of claim 18, where the capacitance comprises a total column capacitance of a particular column in the blob.

* * * * *